(12) United States Patent
Halstvedt et al.

(10) Patent No.: US 12,125,484 B2
(45) Date of Patent: *Oct. 22, 2024

(54) CONTROLLING AN ENGAGEMENT STATE OF AN AGENT DURING A HUMAN-MACHINE DIALOG

(71) Applicant: SoundHound, Inc., Santa Clara, CA (US)

(72) Inventors: Scott Halstvedt, Santa Clara, CA (US); Keyvan Mohajer, Los Gatos, CA (US); Bernard Mont-Reynaud, Sunnyvale, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/562,891

(22) Filed: Dec. 27, 2021

(65) Prior Publication Data

US 2022/0122607 A1     Apr. 21, 2022

Related U.S. Application Data

(63) Continuation of application No. 15/881,553, filed on Jan. 26, 2018, now Pat. No. 11,250,844.

(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 21/32* (2013.01); *G10L 15/08* (2013.01);
(Continued)

(58) Field of Classification Search
CPC ......... G10L 15/22; G10L 15/08; G10L 17/04; G10L 17/06; G10L 17/22; G10L 17/00;
(Continued)

(56) References Cited

U.S. PATENT DOCUMENTS

| | | | |
|---|---|---|---|
| 5,615,296 A | 3/1997 | Stanford et al. | |
| 5,924,070 A * | 7/1999 | Ittycheriah | H04M 3/42204 704/275 |

(Continued)

FOREIGN PATENT DOCUMENTS

| | | |
|---|---|---|
| EP | 3324289 A1 | 5/2018 |
| JP | 2004004239 A | 1/2004 |

(Continued)

OTHER PUBLICATIONS

Aarabi, et al., Cooperative Sensation: A Mechanism For Robust Human-Computer Interaction, Proceedings of the 5th World Multi-Conference on Circuits, Systems, Computers, and Communication, 2001.

(Continued)

*Primary Examiner* — Thuykhanh Le
(74) *Attorney, Agent, or Firm* — Haynes Beffel & Wolfeld LLP; Andrew L. Dunlap; Jason Liao

(57) ABSTRACT

A method of controlling an engagement state of an agent during a human-machine dialog is provided. The method can include receiving a spoken request that is a conditional locking request, wherein the conditional locking request uses a natural language expression to explicitly specify a locking condition, which is a predicate, storing the predicate in a format that can be evaluated when needed by the agent, entering a conditionally locked state in response to the conditional locking request, in the conditionally locked state, receiving a multiplicity of requests without a need for a wakeup indicator, and for a request from the multiplicity of requests evaluating the predicate upon receiving the request, and processing the request if the predicate is true.

17 Claims, 29 Drawing Sheets

Related U.S. Application Data

(60) Provisional application No. 62/484,845, filed on Apr. 12, 2017.

(51) Int. Cl.

| | | |
|---|---|---|
| *G06F 21/32* | (2013.01) | |
| *G06V 40/16* | (2022.01) | |
| *G10L 15/08* | (2006.01) | |
| *G10L 17/00* | (2013.01) | |
| *G10L 17/04* | (2013.01) | |
| *G10L 17/06* | (2013.01) | |
| *G10L 17/22* | (2013.01) | |

(52) U.S. Cl.
CPC .............. *G10L 17/04* (2013.01); *G10L 17/06* (2013.01); *G10L 17/22* (2013.01); *G06V 40/16* (2022.01); *G06V 40/166* (2022.01); *G10L 2015/088* (2013.01); *G10L 2015/223* (2013.01); *G10L 17/00* (2013.01)

(58) Field of Classification Search
CPC ......... G10L 2015/088; G10L 2015/223; G10L 2015/226; G10L 2015/227; G06F 3/167; G06F 21/32; G06V 40/16; G06V 40/166
USPC ........................................................ 704/246
See application file for complete search history.

(56) References Cited

U.S. PATENT DOCUMENTS

| | | | |
|---|---|---|---|
| 10,438,591 B1* | 10/2019 | Sharifi | G10L 15/22 |
| 10,460,597 B2* | 10/2019 | Shin | G08C 17/02 |
| 11,250,844 B2 | 2/2022 | Mont-Reynaud et al. | |
| 11,410,646 B1* | 8/2022 | Erbas | G10L 15/1822 |
| 2004/0095389 A1 | 5/2004 | Sidner et al. | |
| 2008/0147407 A1* | 6/2008 | Da Palma | G10L 15/22 704/E15.04 |
| 2008/0235019 A1* | 9/2008 | Witzman | G10L 17/26 704/E15.045 |
| 2008/0312924 A1 | 12/2008 | De Los Reyes et al. | |
| 2009/0055193 A1* | 2/2009 | Maislos | G10L 17/26 704/273 |
| 2009/0061837 A1* | 3/2009 | Chaudhri | G06F 3/167 455/418 |
| 2010/0332648 A1 | 12/2010 | Bohus et al. | |
| 2011/0069024 A1* | 3/2011 | Kim | G06F 3/0487 345/173 |
| 2012/0185090 A1* | 7/2012 | Sanchez | B25J 9/161 700/253 |
| 2013/0085755 A1* | 4/2013 | Bringert | G10L 21/10 704/235 |
| 2013/0100045 A1* | 4/2013 | Honji | G06F 3/0416 345/173 |
| 2013/0226591 A1* | 8/2013 | Ahn | H04W 52/027 704/275 |
| 2013/0275164 A1 | 10/2013 | Gruber et al. | |
| 2013/0298024 A1* | 11/2013 | Rhee | H04M 1/67 715/716 |
| 2013/0325484 A1* | 12/2013 | Chakladar | G10L 15/26 704/275 |
| 2013/0339020 A1* | 12/2013 | Heo | H04N 21/6581 704/254 |
| 2014/0059365 A1* | 2/2014 | Heo | G06F 1/3215 713/320 |
| 2014/0195247 A1* | 7/2014 | Parkinson | G10L 15/22 704/275 |
| 2014/0222436 A1 | 8/2014 | Binder et al. | |
| 2014/0249676 A1 | 9/2014 | Florencio et al. | |
| 2014/0257807 A1* | 9/2014 | Mauro | G10L 21/06 704/235 |
| 2014/0274203 A1* | 9/2014 | Ganong, III | G10L 15/02 455/563 |
| 2014/0279719 A1 | 9/2014 | Bohus et al. | |
| 2014/0297288 A1 | 10/2014 | Yu et al. | |
| 2014/0343952 A1* | 11/2014 | Capless | H04N 21/4821 704/275 |
| 2015/0051913 A1* | 2/2015 | Choi | G06F 21/32 704/273 |
| 2015/0194167 A1* | 7/2015 | Jeong | H04N 21/42203 704/275 |
| 2015/0287413 A1* | 10/2015 | Jung | G10L 15/32 704/231 |
| 2015/0302857 A1* | 10/2015 | Yamada | G10L 15/22 704/275 |
| 2015/0326985 A1* | 11/2015 | Priyantha | G06F 1/3287 381/56 |
| 2015/0328082 A1* | 11/2015 | Jiang | A61H 23/02 600/38 |
| 2015/0340042 A1* | 11/2015 | Sejnoha | H04M 1/724 704/275 |
| 2015/0346845 A1* | 12/2015 | Di Censo | G06F 3/012 345/158 |
| 2015/0348548 A1 | 12/2015 | Piernot et al. | |
| 2015/0348554 A1* | 12/2015 | Orr | G05B 15/02 |
| 2015/0350405 A1* | 12/2015 | Rettig | G06F 21/32 455/420 |
| 2016/0063314 A1* | 3/2016 | Samet | G06F 21/31 348/78 |
| 2016/0063989 A1* | 3/2016 | Deleeuw | G10L 15/22 345/473 |
| 2016/0071516 A1* | 3/2016 | Lee | G10L 15/30 704/251 |
| 2016/0118039 A1* | 4/2016 | Moon | G10L 15/08 704/239 |
| 2016/0119338 A1* | 4/2016 | Cheyer | H04L 63/10 726/4 |
| 2016/0133259 A1* | 5/2016 | Rubin | G10L 25/51 704/238 |
| 2016/0155443 A1* | 6/2016 | Khan | G06F 3/167 704/275 |
| 2016/0179464 A1* | 6/2016 | Reddy | G10L 15/22 715/728 |
| 2016/0240213 A1* | 8/2016 | Wen | G10L 13/00 |
| 2016/0249211 A1* | 8/2016 | Åstrand | H04W 12/068 |
| 2016/0368484 A1* | 12/2016 | Lee | B60W 10/06 |
| 2016/0379105 A1* | 12/2016 | Moore, Jr. | H04L 67/52 706/11 |
| 2017/0162197 A1* | 6/2017 | Cohen | G10L 15/22 |
| 2017/0168486 A1* | 6/2017 | Tommy | G05D 1/0088 |
| 2017/0169817 A1* | 6/2017 | VanBlon | G10L 15/02 |
| 2018/0061403 A1* | 3/2018 | Devaraj | G06F 3/167 |
| 2018/0061404 A1* | 3/2018 | Devaraj | G10L 15/22 |
| 2018/0098277 A1* | 4/2018 | Brageul | H04B 1/385 |
| 2018/0182385 A1* | 6/2018 | Stahl | G10L 15/19 |
| 2018/0196934 A1* | 7/2018 | Löthgren | H04L 63/0861 |
| 2018/0239885 A1* | 8/2018 | Kumar | G06V 40/1306 |
| 2018/0247645 A1* | 8/2018 | Li | G06F 3/167 |
| 2019/0049942 A1* | 2/2019 | Dusane | G10L 15/22 |
| 2019/0130911 A1* | 5/2019 | Hanes | H04W 52/0254 |

FOREIGN PATENT DOCUMENTS

| | | | |
|---|---|---|---|
| JP | 2006263348 A | 10/2006 | |
| JP | 2014502566 A | 2/2014 | |
| JP | 2014517366 A | 7/2014 | |
| JP | 2015513704 A | 5/2015 | |
| JP | 2016004270 A | 1/2016 | |
| JP | 2016508007 A | 3/2016 | |

OTHER PUBLICATIONS

Baltrusaitis, et al., OpenFace: an open source facial behavior analysis toolkit, 2016 IEEE Winter Conference on Applications of Computer Vision (WACV), Mar. 7-10, 2016.

Bohus, et al., Managing Human-Robot Engagement with Forecasts and . . . um . . . Hesitations, ICMI '14, Proceedings of the 16th International Conference on Multimodal Interaction, pp. 2-9, Istanbul, Turkey, Nov. 12-16, 2014.

(56) References Cited

OTHER PUBLICATIONS

Bohus, et al., Models for Multiparty Engagement in Open-World Dialog, Proceedings of SIGDIAL 2009: the 10th Annual Meeting of the Special Interest Group in Discourse and Dialogue, pp. 225-234, Queen Mary University of London, Sep. 2009.

Castellano, et al., Detecting User Engagement with a Robot Companion Using Task and Social Interaction-based Features, Proceeding ICMI-MLMI '09 Proceedings of the 2009 international conference on Multimodal interfaces, pp. 119-126, Nov. 2-4, 2009.

Chao, Thesis: Timing Multimodal Turn-Taking in Human-Robot Cooperative Activity, Georgia Institute of Technology, May 2015.

Chen, et al., Distant Multi-Speaker Voice Activity Detection Using Relative Energy Ratio, International Conference on Acoustics, Speech and Signal Processing, 2012.

Collobert, et al., Listen: A System for Locating and Tracking Individual Speakers, Proceedings of the Second International Conference on Automatic Face and Gesture Recognition, 1996-Oct. 16, 1996.

Duplessis, et al., Towards the Consideration of Dialogue Activities in Engagement Measures for Human-Robot Social Interaction, International Conference on Intelligent Robots and Systems, Hambourg, Germany. Designing & Evaluating Social Robots for Public Settings Workshop, pp. 19-24, Designing & Evaluating Social Robots for Public Settings Workshop, Sep. 2015.

Hacker, et al., Interacting With Robots—Tooling and Framework for Advanced Speech User Interfaces, Konferenz Elektronische Sprachsignalverarbeitung 2017, Saarbrücken, pp. 99-106.

Huang, et al., Conversational Engagement Recognition Using Auditory and Visual Cues, Interspeech 2016, San Francisco, pp. 590-594, Sep. 8-12, 2016.

Keizer, et al., Machine Learning for Social Multi-Party Human-Robot Interaction, Journal ACM Transactions on Interactive Intelligent Systems (TiiS)-Special Issue on Multiple Modalities in Interactive Systems and Robots archive vol. 4 Issue 3, Article No. 14, Oct. 2014.

Kelly, Active Speaker Localisation and Tracking using Audio and Video, Ph.D. Dissertation, Trinity College, University of Dublin, Mar. 2010.

Klotz, Modeling Engagement in a Multi-Party Human-Robot Dialog, Masterarbeit, im Fach Intelligente Systeme an der Technischen Fakulat Universitat Bielefeld, Nov. 30, 2010.

Kollar, et al., Toward understanding natural language directions, Association for Computing Machinery, Proceeding of the 5th ACM/IEEE International Conference on Human-robot Interaction-HRI '10. Osaka, Japan, 2010. 259., Apr. 7, 2017.

Koons, et al., Integrating Simultaneous Input from Speech, Gaze, and Hand Gestures, Book: Intelligent multimedia Interfaces, pp. 257-276, American Association for Artificial Intelligence, 1993.

Mead, et al., Automated Proxemic Feature Extraction and Behavior Recognition: Applications in Human-Robot Interaction, International Journal of Social Robotics, vol. 5, Issue 3, pp. 367-378, Aug. 2013.

Mutlu, et al., Footing In Human-Robot Conversations: How Robots Might Shape Participant Roles Using Gaze Cues, Human-Robot Interaction (HRI) Conference Mar. 11-13, 2009, IEEE Association for Computing Machinery, La Jolla, California, USA.

Rani, et al., Operator Engagement Detection for Robot Behavior Adaptation, International Journal of Advanced Robotic Systems, vol. 4, No. 1, pp. 1-12 (2007).

Rich, et al., Recognizing Engagement in Human-Robot Interaction, 5th ACM/IEEE International Conference on Human-Robot Interaction, Osaka, Japan, pp. 375-382, Mar. 2-5, 2010.

Rudnicky, et al., Conversational interaction with speech systems, Technical Report, Carnegie Mellon University, 1989.

Sidner, et al., Engagement During Dialogues with Robots, Mitsubishi Electric Research Laboratories, AAAI Spring Symposium Dialogical Robots, Mar. 2005.

Sidner, et al., Where to Look: A Study of Human-Robot Engagement, Mitsubishi Electric Research Laboratories, 2003, Proceedings of the 2004 International Conference on Intelligent User Interfaces, Jan. 13-16, 2004.

Tofighi, et al., Vision-Based Engagement Detection in Virtual Reality, 2016 Digital Media Industry & Academic Forum (DMIAF), Jul. 4-6, 2016.

Tsai, et al., A Study of Multimodal Addressee Detection in Human-Human-Computer Interaction, IEEE Transactions on Multimedia, Issue 9, Sep. 2015.

Vaufreydaz, et al., Starting engagement detection towards a companion robot using multimodal features, Robotics and Autonomous Systems, Elsevier, 2015, Robotics and Autonomous Systems, pp. 25, Mar. 12, 2015.

Yu, Attention and Engagement Aware Multimodal Conversational Systems, ICMI '15, Seattle, Proceedings of the 2015 ACM on International Conference on Multimodal Interaction, pp. 593-597, Nov. 9-13, 2015.

Zuo, et al., Detecting Robot-Directed Speech by Situated Understanding in Physical Interaction, Transactions of the Japanese Society for Artificial Intelligence 25(6): 670-682, 19th International Symposium in Robot and Human Interactive Communication, Sep. 13-15, 2010.

EP 18167125—Extended European Search Report mailed Sep. 4, 2018, 13 pages.

* cited by examiner

CONTROLLING AN ENGAGEMENT STATE OF AN AGENT DURING A HUMAN-MACHINE DIALOG

PRIORITY APPLICATIONS

This application is a continuation of U.S. application Ser. No. 15/881,553, titled "MANAGING AGENT ENGAGEMENT IN A MAN-MACHINE DIALOG", filed Jan. 26, 2018, now U.S. Pat. No. 11,250,844, issued Feb. 15, 2022, which claims the benefit of U.S. Provisional Application No. 62/484,845, titled "SYSTEM AND METHODS FOR MANAGING THE ENGAGEMENT OF A VIRTUAL AGENT", filed Apr. 12, 2017, which are incorporated herein in their entireties by reference.

FIELD OF THE INVENTION

The present invention relates to the field of human-machine dialog, in particular, techniques to improve dialog naturalness and efficiency.

BACKGROUND

A virtual assistant, also called virtual agent, is a computer-based agent able to carry out a natural language dialog with a user. The agent typically provides services to a human user. It responds (or attempts to respond) to natural language requests from users, such as requests for information or requests for action, using a combination of hardware and software.

The very idea of a virtual assistant is anthropomorphic. Familiar assistants such as Ski, Alexa, Cortana, Nina, and others have people names, human-like voices, and perhaps 'personalities' of some sort. Users are encouraged to interact in a natural way with assistants as if they were partners in a human conversation. The assistant provides a communication interface that makes sense to users and hides from view the rest of a system whose internal workings can be extremely complex. Setting aside the internal complexities of a virtual agent system as mere details, a primary aspect of the man-machine communication is the notion of engagement. In short, an agent is engaged when it acts upon the requests it receives from the user.

In an Interactive Voice Response (IVR) system, a human user and a virtual assistant communicate over a phone line. They are engaged in conversation: the assistant listens to, and processes or attempts to process) everything the user says.

In a more open situation, a user's speech may be directed to another person in the room, or to a virtual agent. While the agent responds to the user's speech, the agent is engaged in a dialog. If the agent is engaged, but the user's speech is not intended for the agent, undesirable behavior will result. The agent can give silly or annoying answers; worse, it could take an action that the user did not intend, and the action could have unwanted consequences.

This illustrates a problem known in user interface design as the King Midas effect. The effect refers to the inability of users to prevent the consequences of their user interface activities. As the legend goes, King Midas was greedy, and he had wished to turn everything he touched into gold. His wish was granted literally, and this turned out to be a curse. As he embraced his daughter, she turned into a gold statue; and he starved to death because his food turned into gold when he touched it.

For a concrete example of the King Midas effect, suppose an agent is told, "Get me an Uber to SFO for 8 pm" and acts on the request correctly by accessing Uber to place an order. If the agent remains engaged while the user tells her daughter, "Can you bring my red shoes from the closet, darling" the agent may give a dull response ("I do not understand what you mean"), a cheeky one ("You called me darling . . . . I like you too") or a pragmatic one ("which closet?") but all these responses are inappropriate. The request was in fact addressed to the user's daughter, and no response was expected from the agent. This problem would have been avoided if the agent had become dormant after the Uber request. The King Midas effect must clearly be avoided.

To prevent an agent from acting on user requests at unwanted times, conventional agents disengage the agent after every user request. After serving a request, the agent does not accept a new request until it is forced to re-engage. That is, the user must "wake up" the agent before another request can be processed. A common way to wake up an agent that is to say a wakeword such as "Hey Ski," "OK, Google," or "Alexa" (which can be a single word or a multi-word phrase.) Other ways to wake up an agent include clicks, taps, or pushes, but these are not hands-free.

Note that the wakeword itself is not part of the request. It only serves to gain the agent's attention. It results in overhead, which is a waste of time compared to normal communication between people, where the equivalent of a wakeword is only used in specific circumstances, such as calling a specific person's attention or switching the recipient of an utterance.

To utter a wakeword with every request is not just inefficient, it is also tedious. This issue is known as "wakeword fatigue." People have grudgingly accepted to wake up their agents, every time, for lack of a better way.

In short, the familiar way to prevent the King Midas effect has a substantial cost. It makes man-machine dialogs inefficient, unnatural and wakeword fatigue creates a poor user experience. There is a need for methods that support a more efficient, fluid, and natural communication between human users and their virtual agents.

SUMMARY OF THE INVENTION

This disclosure is directed to improvements in the efficiency and fluidity of man-machine dialog over current methods. The need to avoid the King Midas effect is addressed by approaches that, unlike traditional approaches, do not cause wakeword fatigue. The non-traditional engagement policies described have a shared goal, to minimize or eliminate the need to "wake up" agents before every request. Several engagement policies are disclosed, that make a man-machine dialog more natural and efficient.

Locked engagement policies give users explicit control over an agent's engagement. In such policies, spoken requests or event indicators can force an agent in or out of a locked state of engagement, a state in which the agent remains engaged and able to process requests repeatedly until explicitly unlocked. Locked engagement can be unconditional; this is a very important case because, despite its simplicity, it goes a long way to combat wakeword fatigue. Unconditional locked engagement allows an arbitrarily long sequence of requests to be processed without intervening wake-up indicators until the user chooses to unlock the agent's state. A variant of locked engagement allows the user place specific conditions on engagement, such as who can engage, or when. A further variant of conditional locked engagement reserves the agent's attention for a specific user (to the exclusion of others) for a renewable period of time; there is no communication overhead. Unconditional locking and reserved engagement both offer simple and practical solutions to the avoidance of wakeword fatigue.

Another engagement policy, the "Attentive Agent" policy, relies on the intelligence of an agent to make autonomous engagement and disengagement decisions, in context, based on the agent's perception of the situation, the user, and a model of human-like engagement. An attentive agent remains engaged as long as it believes that the user wants to engage; it must pay attention and be able, much like people involved in a natural human dialog, to take advantage of many clues to determine, at each point in time, whether the user wants to remain engaged. Finally, hybrid policies are defined, that integrate the locked engagement policy with the attentive agent policy.

The applications range from intelligent assistants, through speech-enabled devices of all types, including isolated internet of things (IoT) devices, to intelligent spaces with potentially many sensors and effectors, such as automobiles, intelligent homes, offices, stores and shopping malls, and humanoid robots.

DETAILED DESCRIPTION

Agents and Users

Figure 1A:
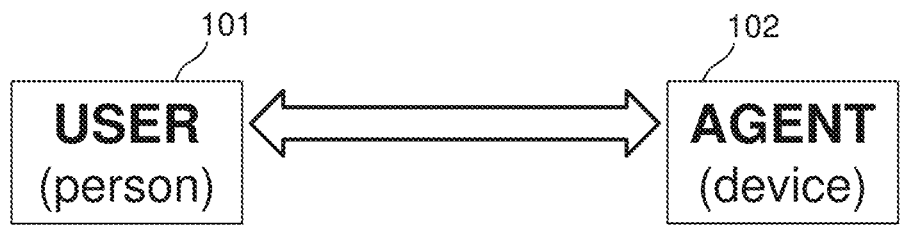
FIG. 1A shows the partners in a man-machine dialog, according to an embodiment.
Figure 1B:
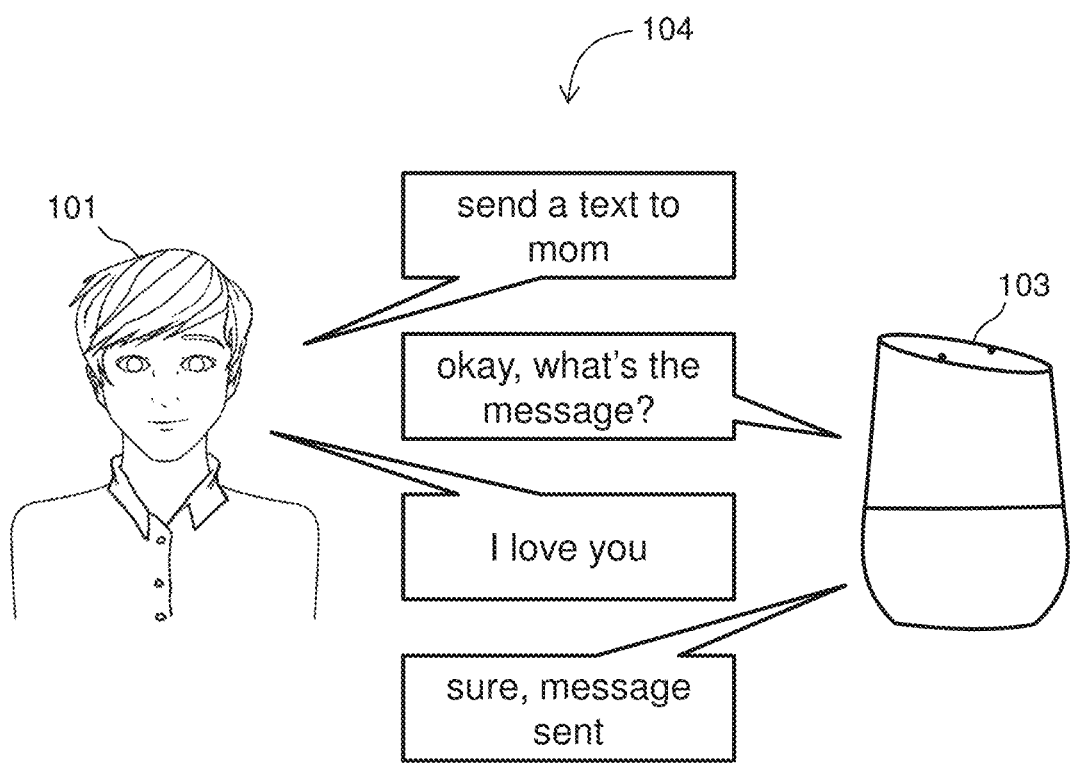
FIG. 1B shows an example man-machine dialog, according to an embodiment.

FIG. 1A shows a diagram of a user 101 and an agent 102. FIG. 1B shows the user 101 and a speaker-based virtual assistant 103 that provides the user-agent interface engaged in dialog 104; the user and agent typically take turns in the dialog. In this disclosure, a user is a person who may engage in a natural language dialog with a virtual agent in order to get responses to natural language requests. A virtual agent (or virtual assistant, assistant, or just agent) is a system, comprising a combination of hardware and software, designed to carry out a natural language dialog with the user. An agent's role is to respond to user requests and provide services such as finding requested information or taking a requested action.

Devices and Sensors

In this disclosure, a device is user-facing hardware that allows a virtual agent to communicate with the user. The agent software may run locally on the device, or it may run in a distributed manner, in which case a user-facing device is typically connected to one or more servers via networks.

Figure 2A:
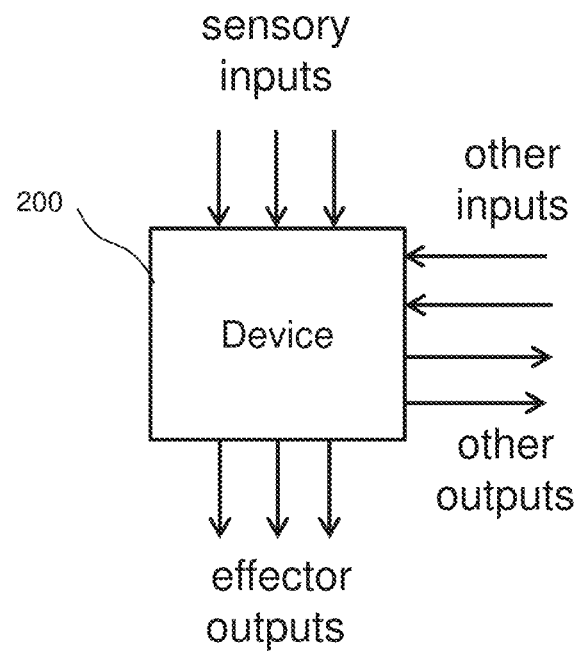
FIG. 2A shows a device with inputs and outputs, according to an embodiment.
Figure 2B:
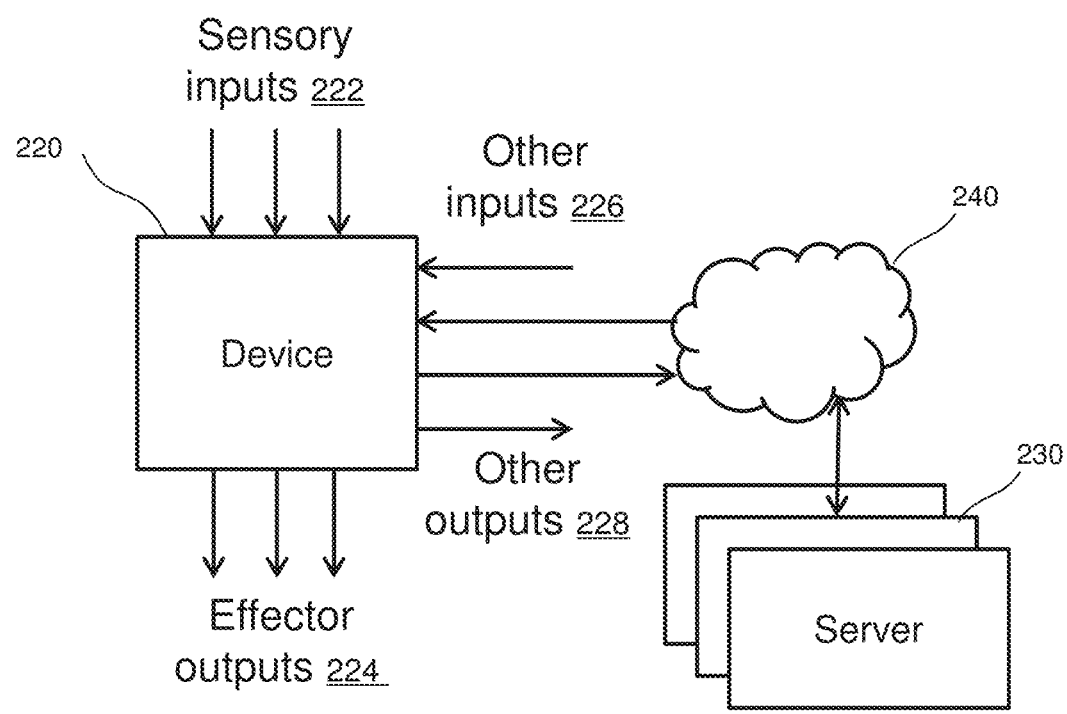
FIG. 2B shows a device with inputs and outputs, connected to servers via a network, according to an embodiment.

A device may execute software locally to perform the functions needed by the agent. FIG. 2A shows a standalone embodiment, where a device 200 provides locally the full functionality needed by the agent. FIG. 2B shows a distributed embodiment, where a device 220 is connected to servers 230 via a network 240, and the agent's functionality is divided between local functionality that runs on the device 220 and remote functionality that runs on servers 230.

FIG. 2A and FIG. 2B both illustrate devices with various inputs and outputs. Some of the inputs, called sensor inputs 222, are of a sensory nature, such as: a digital audio input signals from one or more microphones; video input signals from one or more cameras; input from a touchscreen; and so on. Some of the outputs, called effector outputs 224, are also sensory in nature, including, e.g.: digital audio signals sent to one or more speakers; video output signals sent to one or more visual displays; and status signals sent to readouts such as LEDs. Besides sensor inputs 222 and effector outputs 224, a device 220 may have other inputs 226 and other outputs 228, which may include communication links to other devices on a local network, or to servers 230.

In this disclosure, devices may have numerous sensors and effectors, but there must be (at the bare minimum) one microphone to receive speech, and a speaker or a display to give a user a response in auditory or visual form. Many additional sensors and effectors may be involved. In some embodiments, sensors or effectors include some that the user may not be aware of.

Figure 3A:
FIG. 3A shows a smartphone, according to an embodiment.
Figure 3B:
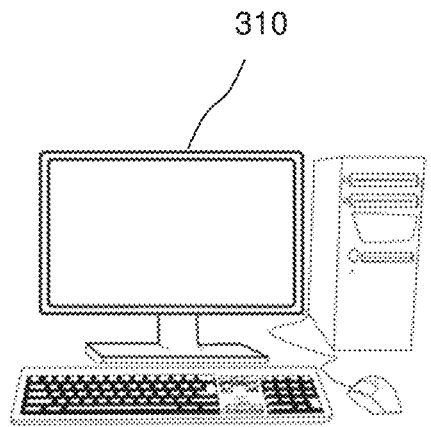
FIG. 3B shows a speech-enabled desktop computer, according to an embodiment.
Figure 3C:
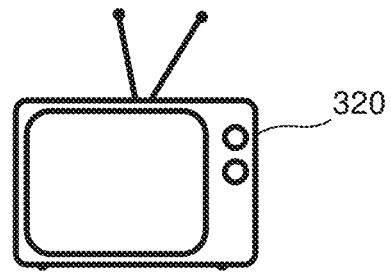
FIG. 3C shows a speech-enabled television, according to an embodiment.
Figure 3D:
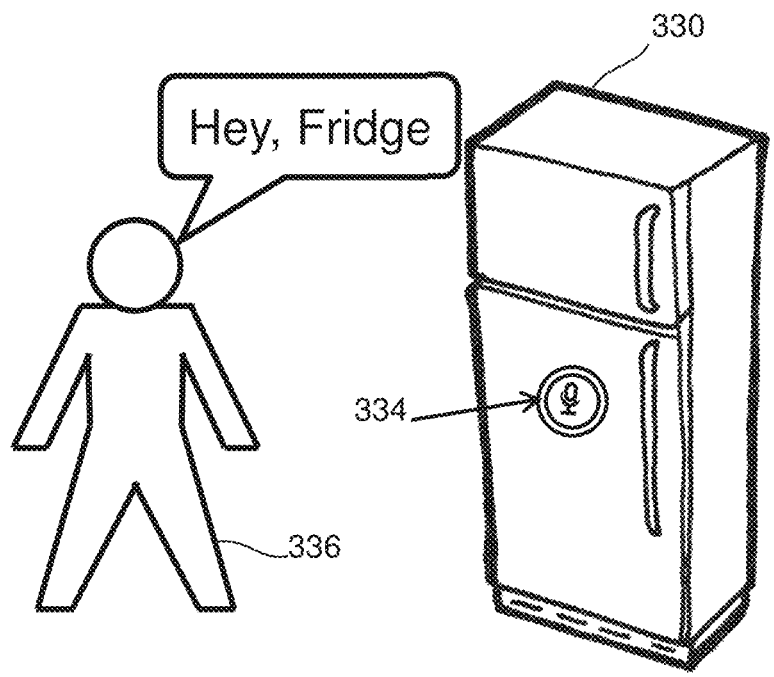
FIG. 3D shows a speech-enabled refrigerator, according to an embodiment.

In this disclosure, the definition of device is quite broad, and there are many types of known devices. Devices include electronic devices such as a smartphone 300 (FIG. 3A), desktop computer 310 (FIG. 3B), smart TV 320 (FIG. 3C), and speaker-based virtual assistant 103 (FIG. 1B). Other devices are voice-enabled home appliances, such as a refrigerator 330 (FIG. 3D), wherein a human user 336 is interacting with a sensor 334 of the refrigerator 330.

In this disclosure, a region of space may be called an intelligent space only if its sensors and effectors are used in a coordinated fashion, as a part of a room agent that can dialog with a user. Homes, offices, public spaces can be called "intelligent spaces." Speech-enabled automobiles (FIG. 3E), to the extent they intelligently coordinate sensors and effectors, also qualify as intelligent spaces.

Figure 3E:
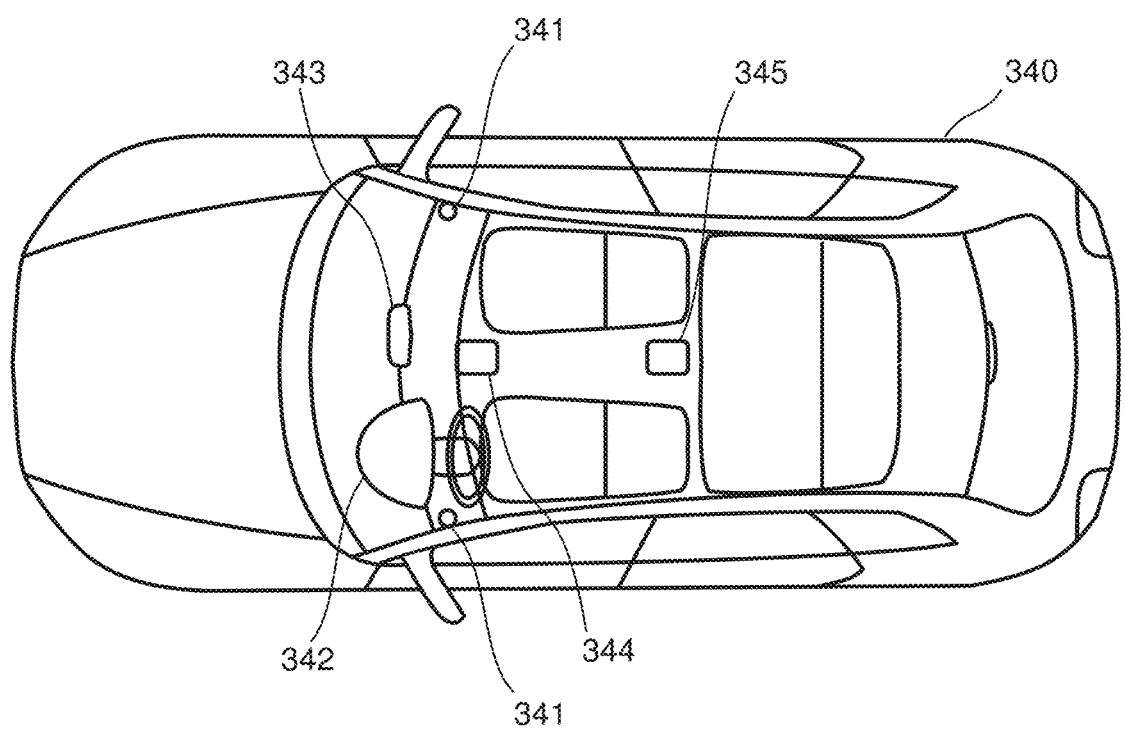
FIG. 3E shows a speech-enabled automobile, according to an embodiment.

FIG. 3E shows an overhead view of an embodiment of automobile 340. It comprises two front seat microphones 341, a heads-up display 342, an exterior camera subsystem 343, a front seat interior camera and microphone subsystem 344, and a back seat interior camera and microphone subsystem 345. Speakers are mounted within the doors and trunk.

Figure 4A:
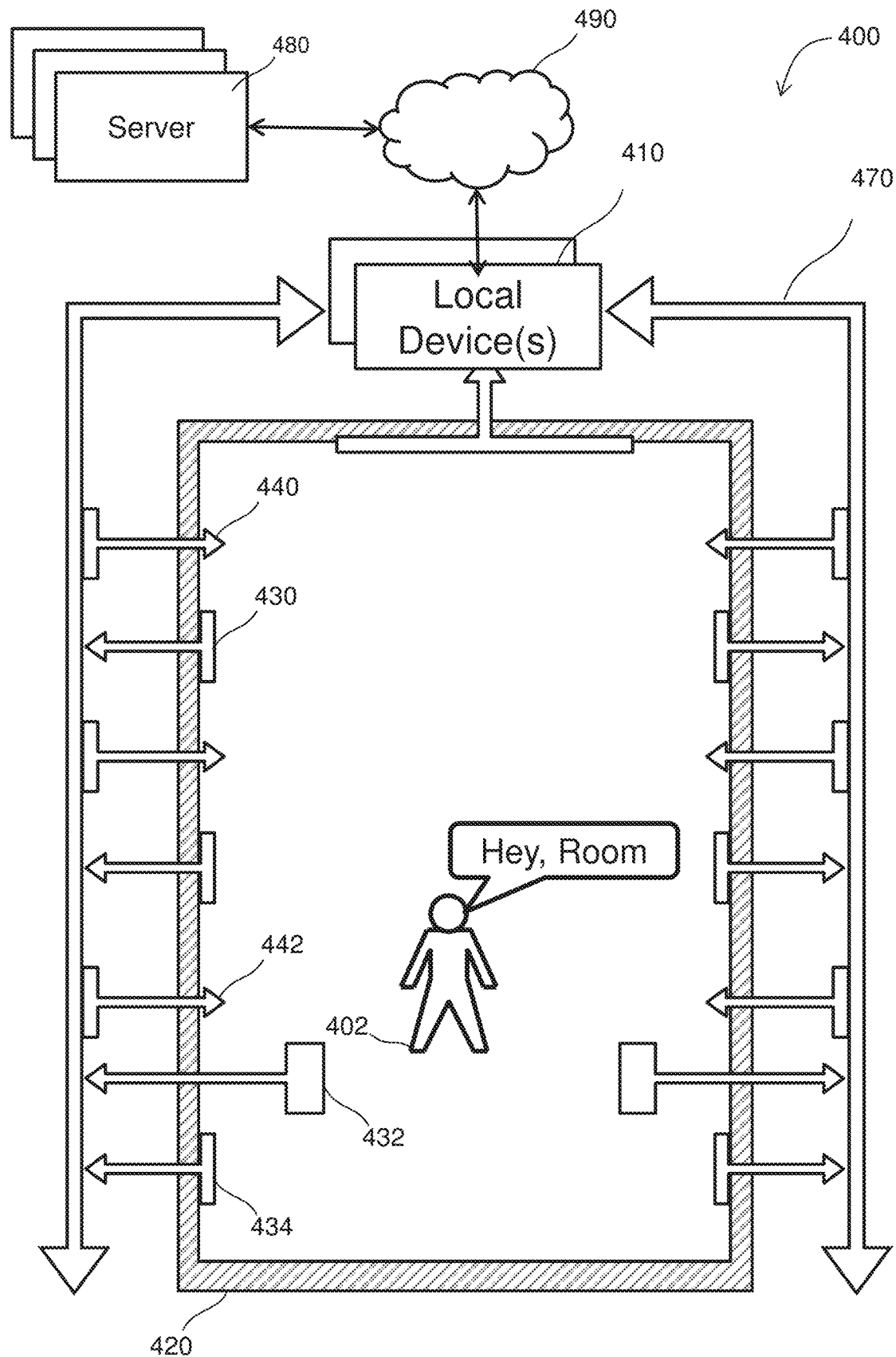
FIG. 4A shows a user in an intelligent space, according to an embodiment.

FIG. 4A shows an abstract view of an intelligent space 400. A human, who is a user 402, is shown inside a living enclosure 420. Sensors 430, 432, 434 (such as microphones and cameras) send signals to local devices 410. Effectors 440, 442 (such as speakers and displays) receive signals from local devices 410, through network cables 470 that may be found inside or outside the living enclosure 420. Here they are shown outside. In other embodiments (not shown), intelligent space 400 can be partly open, partitioned into subspaces, or open—as in a public space or mall.

A "Room" agent controls the functionality of the intelligent space. The Room agent software runs on one or more local devices 410, connected using wires (e.g., the network cables 470) or a wireless local network (not illustrated). In many embodiments, local devices 410 are also connected to one or more servers 480 via a global network 490.

In FIG. 4A, the current user 402 interacts with intelligent space 400. The user says the wakeword "Hey Room" to get the attention of the Room agent. Signals captured by sensors 432 (one of several cameras) or sensors 430 (one of several microphones) are input to the local devices 410.

Figure 4B:
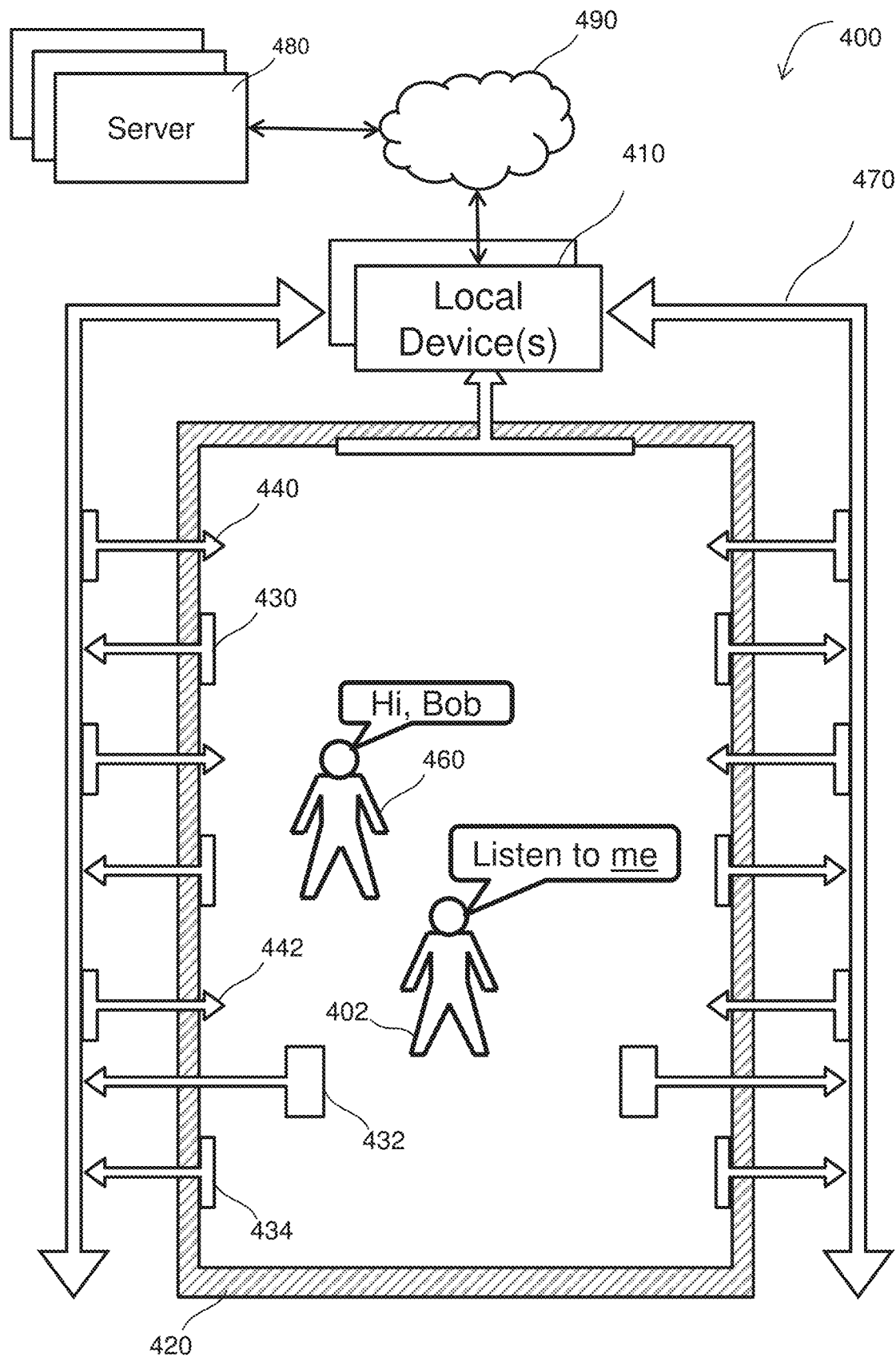
FIG. 4B shows multiple users in an intelligent space, according to an embodiment.

FIG. 4B shows another person 460 whose speech "Hi, Bob" addresses the current user 402 and could confuse the Room agent. Is the agent supposed to respond to requests from person 460, or to ignore them? In a hypothetical embodiment, if the current user 402 had previously said "Listen to Me" to the agent, the speech from person 460 would be ignored. In this disclosure, ways to reserve an agent's attention (or engagement) for current user 402 will be examined.

Figure 5:
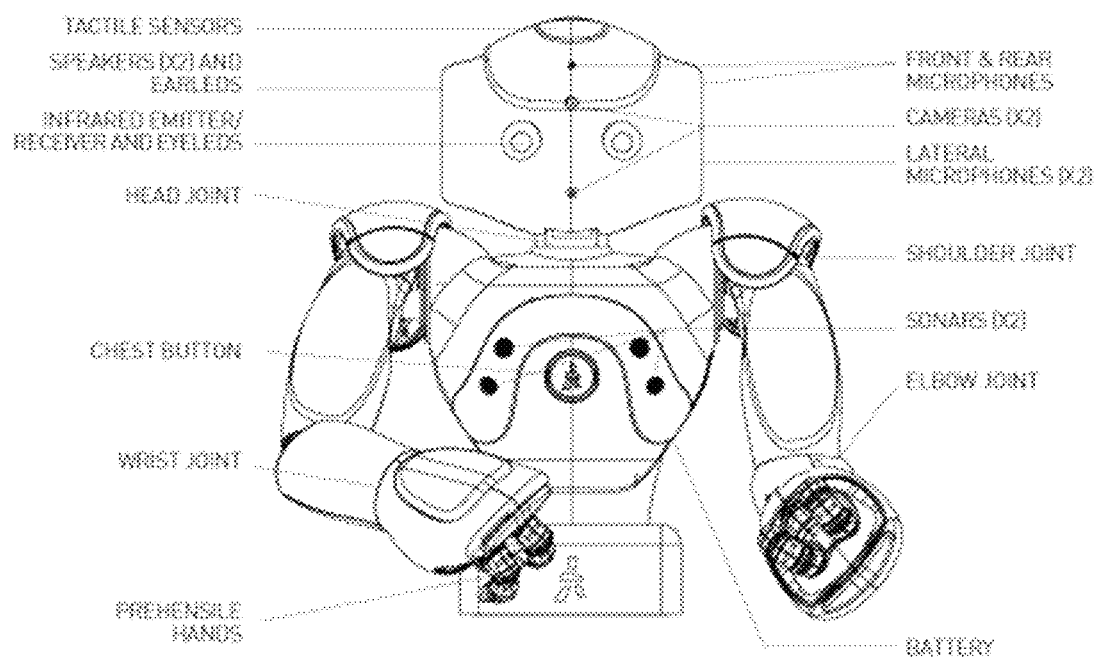
FIG. 5 shows some sensors and effectors of the Nao robot.

Robots are also devices. FIG. 5 shows a typical robot having a number of sensors and effectors enclosed in an anthropomorphic, mobile, object. Specifically, it is the commercially-sold Nao robot. An intelligent space (FIG. 4A) also has many sensors and effectors, but they tend to be spread widely, in a space that encloses users.

In this disclosure, the set of sensors a device has includes at least one microphone. Devices such as a robot or an intelligent space may have many sensors, usually including one or more cameras, multiple microphones, possibly arranged as a microphone array, and perhaps sonar, laser, and so on. Each sensor captures a digital input signal, that the device can process using one or more DSP (digital signal processing) layers. Specific sensors have specific processing layers, and later DSP layers can achieve multi-sensor integration, as discussed later.

The use of a microphone array (two or more microphones) allows an estimation of the azimuth of an object, relative to the microphone array's position in space. It can also improve the attenuation of background noise when capturing the speech.

The use of one or more cameras allows the measurement of many features of an object, such as its apparent size and shape, or its azimuth from a point of view. The use of multiple cameras helps determine depth and 3D shapes; it also provides a choice of a point of view that yields more information.

Glossary of Technical Terms

The key technical terms used in this disclosure will now be defined. Terms in this glossary refer to each other freely. Some sections of the glossary disclose significant aspects of the invention and provide a high-level summary of some of the ideas.

Agents, FSAs and Engagement States

Engagement—During a man-machine dialog, engagement refers to the willingness (or apparent ability) of an agent to receive a user request and process it. Processing a request, after receiving it as an input, normally includes understanding it, acting on it, and producing an answer as output. An engaged agent processes requests. A disengaged agent does not process requests; whether it actually "hears" them or not is immaterial. In common parlance, an engaged agent is said to be "listening," and "has its microphone turned on," and a disengaged agent "has its microphone turned off," but this wording must not be taken literally, since a disengaged agent's microphone captures signals continuously when it waits for a wakeword. It is the ability to process requests that alone defines engagement.

Figure 6A:
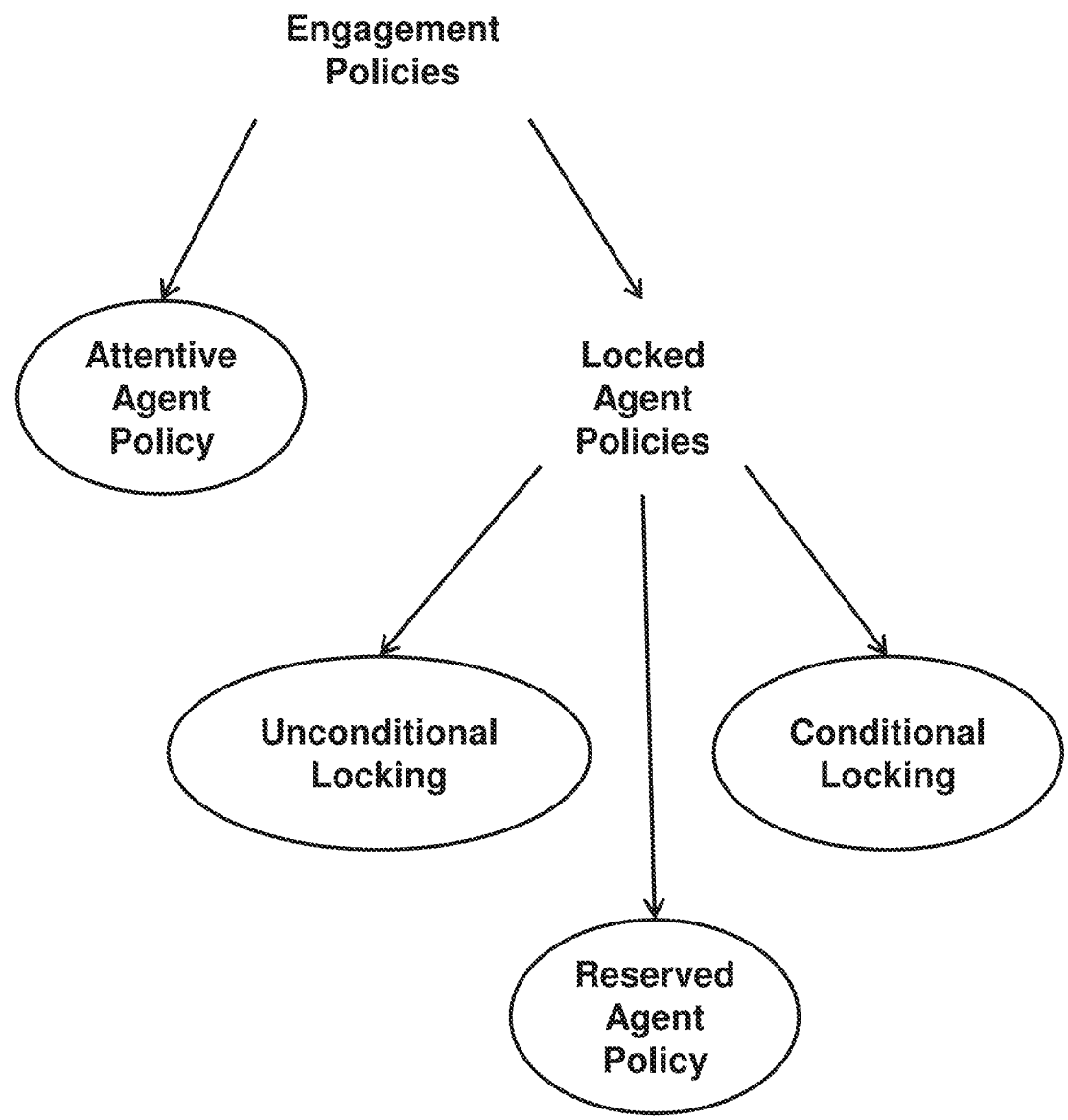
FIG. 6A shows a view of a hierarchy of engagement policies, according to an embodiment.

Engagement policy—An engagement policy is a systematic way to handle the state of engagement of an agent during a man-machine dialog. FIG. 6A is an overview of various policies to be disclosed hereafter. These policies differ from a policy that causes wakeword fatigue, which they all intend to replace in one way or another. They include an attentive agent policy, and three locked agent policies: unconditional locking, conditional locking, and a reserved agent policy.

Policy Implementation—An engagement policy describes a high-level process that determines when an agent is engaged, regardless of implementation details. In this disclosure, engagement policies are described by finite state automata (FSAs). An FSA is a well-known abstract representation that communicates in a simple way the allowed states and state transitions in a system. FSAs can be implemented in many different ways, which are essentially equivalent and covered under this disclosure.

FSA—A finite state automaton (FSA) comprises labeled states (which are nodes in a directed graph) and transitions (which are directed edges between the nodes). Each transition has an associated condition, whose satisfaction allows the state transition to occur. In addition, transitions are optionally associated with processing actions. A processing action associated with a transition is executed after the transition's condition has been satisfied, and before the state transition is completed.

States of engagement—An agent's state of engagement (or simply state) expresses the agent's readiness to process requests from a user. The engagement states that this disclosure considers include dormant states and different types of engaged states. As these types are defined and discussed, it will be helpful to refer to FIG. 6B, which shows a taxonomy of all the engagement states discussed in this disclosure.

Dormant states—A state in which an agent does not process requests is called dormant. A dormant agent (i.e., an agent in the dormant state) is disengaged, and it will not re-engage without receiving a wake-up indicator. All non-dormant states in this disclosure are engaged states; see FIG. 6B.

Engaged states—An agent in an engaged state processes user requests, that is, it interprets requests, acts on them, and produces responses. The present disclosure uses different classes of engaged states to support different engagement policies.

One-time states—An agent in a one-time state is engaged. However, it disengages immediately after processing a single request and enters a dormant state. Hence, a wake-up indicator will be required before a subsequent request can be processed.

Recurrent states—An agent in a recurrent state is engaged, but unlike a one-time state, multiple requests can be processed in a recurrent state without requiring a wake-up indicator. An agent remains in the same recurrent state, by default, until it detects a condition that causes it to exit the state. Several types of recurrent states will be described; see FIG. 6B.

Locked states—Locked states are recurrent, and thus engaged. A locked state is entered following an explicit Lock request. An agent leaves a locked state following an explicit Unlock request or a timeout. When verbal, a Lock request may specify an optional locking condition. If no locking condition is specified, the locking condition has the value True, and the state is locked unconditionally; if a locking condition is specified, it is evaluated at request processing time. After processing the first request, a locked agent remains in the same state and repeatedly processes additional requests, while the locking condition is satisfied, until it detects an explicit Unlock request or a timeout.

Reserved states—A reserved state is a variation of a conditional locked state, but its built-in locking condition reserves the use of the agent for a specific user, called the reference user; it denies other users the ability to process requests. Reserved states support the reserved agent policy. Unlike a locked state, a reserved state is entered automatically, without an explicit Lock request. It is entered after an arbitrary request; however, entering the reserved state defines and characterizes a reference user. The locking condition requires that a subsequent user issuing a request must be the same as the reference user (as far as the agent can tell) for the request to be processed. Hence, an agent in a reserved state repeatedly processes requests (from the reference user only) until an explicit Unlock request or a timeout.

Attentive states—Attentive states support the attentive agent policy; they replace one-time states. Like a locked agent, an attentive agent is recurrent and processes requests repeatedly without a change of state. But unlike a locked agent, an attentive agent can choose to disengage, based on perceived events. Timeouts can also cause disengagement.

Actions and Indicators

Actions, Events, and Indicators—A user action is something a user can do or say to instruct an agent to change state. User actions do not include spoken requests made to the agent, except when the spoken request is explicitly asking for a change in the agent's state. An event is a condition detected by an agent, that can cause the agent to change state. A true distinction between actions (originated by a user) and events (detected by an agent) is hard to make, since a user action must be recognized by an agent to take effect, and the recognition itself amounts to an event. To avoid subtle issues that arise in the attempt to distinguish between actions and events, the term "indicator" will be used for both actions and events throughout this disclosure. The agent detects indicators, be they actions that a user originates, or events that a user may or may not be aware of.

Reserved Gestures—Reserved gestures include taps, swipes, clicks, button presses or releases, and more complex gestures that enable a user to easily communicate with an agent. Complex gestures include hand gestures, turning one's body towards a hot spot, walking in a direction, shifting one's gaze towards a hot spot (including making or breaking of eye contact with a robot) and the like. Familiar gestures are preferred for the quality of user experience, especially when the connotations are right, e.g., making eye contact used to suggest engagement and breaking eye contact used to suggest disengagement. Reserved gestures may include any user movement that the agent can detect. The movement may not be intentional, and the user may or may not be aware of the detection.

Hot spot—A hot spot is an area where users may direct their attention, or not, such as a robot's eyes (making eye contact vs. breaking eye contact), or turning their body towards or away from a robot or a spatial area. To detect events related to hot spots, agents can use gaze detection, face detection or body detection techniques.

Reserved Sounds—Although they may involve speech, and often precede a spoken request, reserved sounds are not spoken requests. They include wakewords, other indicator phrases that a word spotter can identify, and relatively brief sounds that the agent can recognize, such as bell sounds, drum hits, phone ring tones, or music notes. The list is not exhaustive; one can imagine a toy xylophone that a child uses to control an edutainment robot; or a whistle that gets the attention of a robot dog . . . . Short sounds are especially useful if they can be quickly identified—as fast or faster than wakewords—for latency reasons. Also, reserved sounds should be chosen for their right connotations for a user; for example, a high tone or percussive sound has an arousal quality that suggests them as wake-up indicators.

Wake-up Indicators—A wake-up action is something a user can do or say to ask an agent to engage. Wake-up actions include: making speech sounds like wakewords or other reserved wake-up sounds, making wake-up gestures, including taps, swipes, clicks, button presses or releases, and other reserved gestures. A wake-up event is a condition that an agent detects autonomously, and that causes it to engage. Wake-up actions and wake-up events are both wake-up indicators. A dormant state can have multiple wake-up indicators, and different wake-up indicators can transition to different states.

Wakeword Fatigue—Having to say a wakeword before every request results in a poor user experience that creates wakeword fatigue. It may not be possible to eliminate entirely the use of wake-up indicators, but their occasional use, under predictable conventions, should not result in wakeword fatigue.

Lock Indicators—A lock action is something a user can do or say to tell an agent to transition to a locked state. Lock actions include gestures and sounds reserved for the locking of an agent's state. A lock action can also be a spoken request. A lock event is a condition detected autonomously by an agent, causing it to transition to a locked state. Lock actions and lock events are both lock indicators.

Unlock Indicators—An unlock action is something a user can do or say to tell an agent to transition out of a locked state. Unlock actions include gestures and sounds reserved for the unlocking of an agent's state. An unlock action can be a spoken request. An unlock event is a condition detected autonomously by an agent, that causes it to transition out of a locked state. Unlock actions and unlock events are both Unlock indicators.

Release Indicators—A Release indicator is a condition detected by an agent, which causes it to transition out of an attentive state.

EOU Indicators—An End-Of-Utterance signals the end of a user's speech segment, that is presumed to constitute a turn in a dialog. An EOU may be detected, using a voice activity detector (VAD), by finding a pause of sufficient length in a user's speech utterance. The pause duration threshold is chosen so that intra-word and inter-word gaps are too short to cause an EOU. An EOU may also result from a user action such as a tap or click, or the pushing or releasing of a physical button, that effectively terminate the speech input. Finally, an EOU may result from a timeout that limits the utterance length to a specific amount of time.

Voice Activity Detector (VAD)—A signal processing technique used to separate a speech signal from silence or other non-speech sounds. It is used for detecting the beginning and the end of speech segments such as utterances.

Dialog

Utterance—A user's speech segment, started by detecting speech activity, and terminated by an EOU (end of utterance). When a wakeword is present, the utterance begins after the wakeword, rather than at the beginning of the speech, as detected by a VAD.

Request—A request is an utterance from a user addressed to an agent. The request usually asks for a service to be performed by the agent on behalf of the user. Typical requests are requests for information and requests for action.

Request processing—Processing a request may include steps such as: capturing an uttered request; performing speech recognition to obtain a transcription from the utterance; parsing the transcribed request to create an interpretation; and executing the interpretation, which amount to executing (or fulfilling) the request.

Request execution—Acting on an interpreted request, by retrieving information or by executing an action, and creating output for the user. The terms 'executing' and 'acting on' are used interchangeably.

Modal dialog—In the course of a dialog, the user, and the agent take turns. In an IVR system, the agent has the initiative; it asks questions, and the user responds. In the dialog with an assistant, the user generally has the initiative and makes requests, to which the agent responds. However, during a modal dialog, the assistant takes back the initiative and asks questions from the user.

In the dialog in FIG. 1B, "send a text to mom" is a request from the user. The assistant determines that the request is incomplete, and enters a modal dialog to complete it. The agent asks a clarifying question, "okay, what's the message?". The user answers, "I love you". The agent determines that the original request is now complete and answers it, "sure, message sent". During the entire dialog, the agent and user remain engaged.

Reference user—During a dialog with an agent, the reference user is the user whose spoken request was most recently processed by the agent.

New user—In a man-machine dialog, a "new user" is a person whose speech is being received by the agent. The new user can be the same person as the reference user. If the new user's utterance gets processed as a spoken request, the reference user becomes the new user. In some embodiments, an agent may compare the voices of the new user and the reference user, to make engagement decisions.

Hot zone—A "hot zone" is a region of space where certain user actions can take place, as opposed to "cold" zones. Users in a hot zone have certain powers that users in cold zones do not have. The hot/cold distinction can be made with cameras, microphone arrays, or any other appropriate technology.

Feature—This word resists precise definition. A good dictionary defines a feature as "a distinctive attribute or aspect of something." In sensory neurophysiology, feature detection is a process by which the nervous system filters complex natural stimuli in order to extract cues with a high likelihood of being associated with relevant objects or organisms in their environment, as opposed to irrelevant background or noise. In digital signal processing, the terms feature and feature extraction are used in much the same way, as part of a process of analysis and object identification from sensory input signals. Features are often viewed in a hierarchy, where lower-level features map to higher-level features in a bottom-up view of the hierarchy, or conversely. Feature detection modules are frequently built using layers of abstraction in such a hierarchy, to detect objects and attributes that are relevant to an agent's goals.

Scene Analysis—In this disclosure, scene analysis is used to refer to the (largely sensor-based) computations carried out by an agent to support its perceptual capabilities. Scene analysis features include all its sensory or perceptual features, be they low-level (such as edges in a 3-D camera view of a scene, or a sound spectrum) or progressively higher-level. Scene analysis is a complex and multi-faceted but well established field that includes auditory scene analysis, visual scene analysis, the analysis of other signals, and sensor fusion techniques.

Shorthand Notations and Conventions for Engagement FSAs

In this disclosure, the state of engagement or disengagement of an agent is shown in an FSA. Shorthand notations are used to keep FSAs as simple as possible. These conventions, that regard modal dialogs, request processing and stream processing, will be used throughout the specification to write more compact FSAs.

Figure 6B:
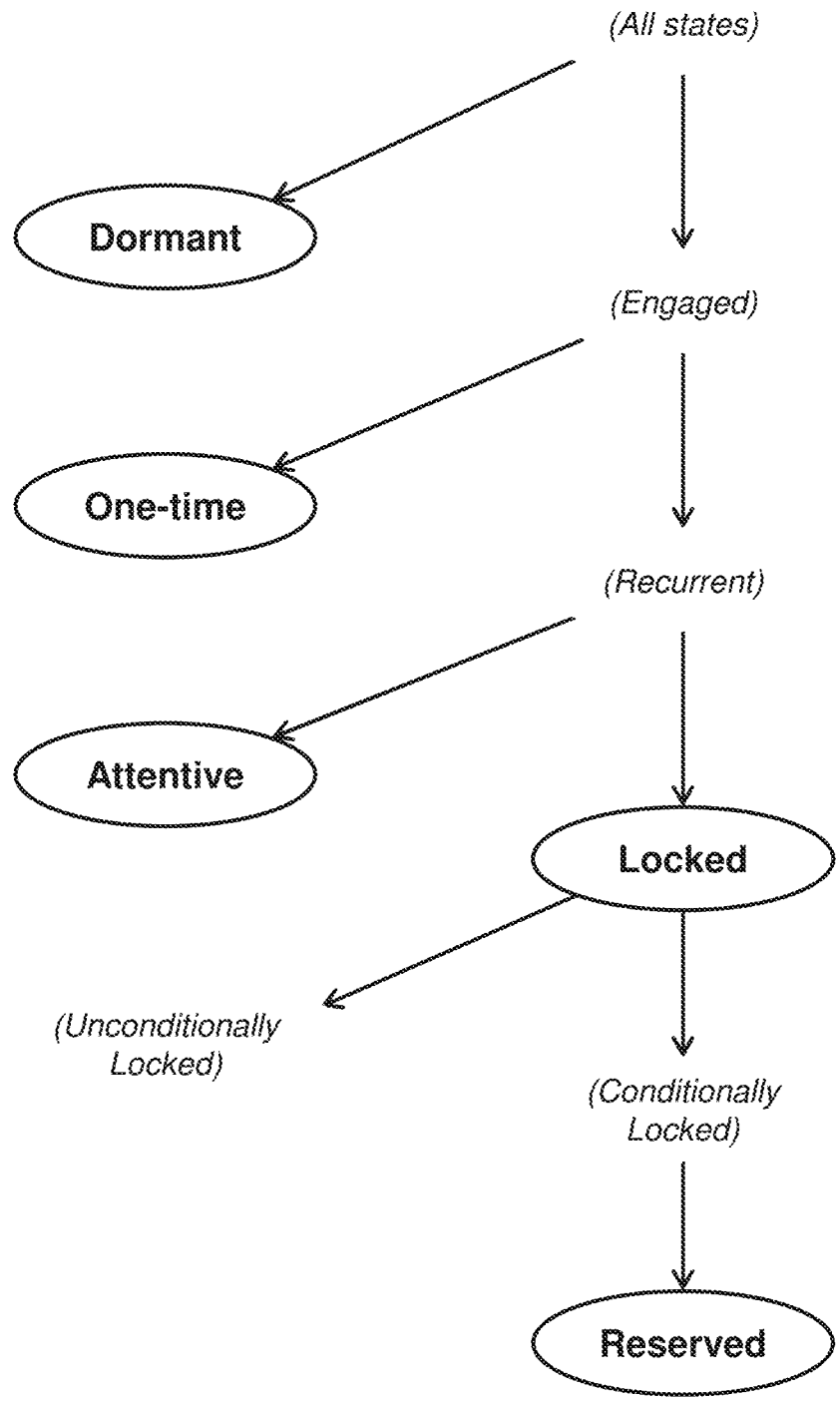
FIG. 6B shows a view of a hierarchy of engagement states, according to an embodiment.
Figure 7A:
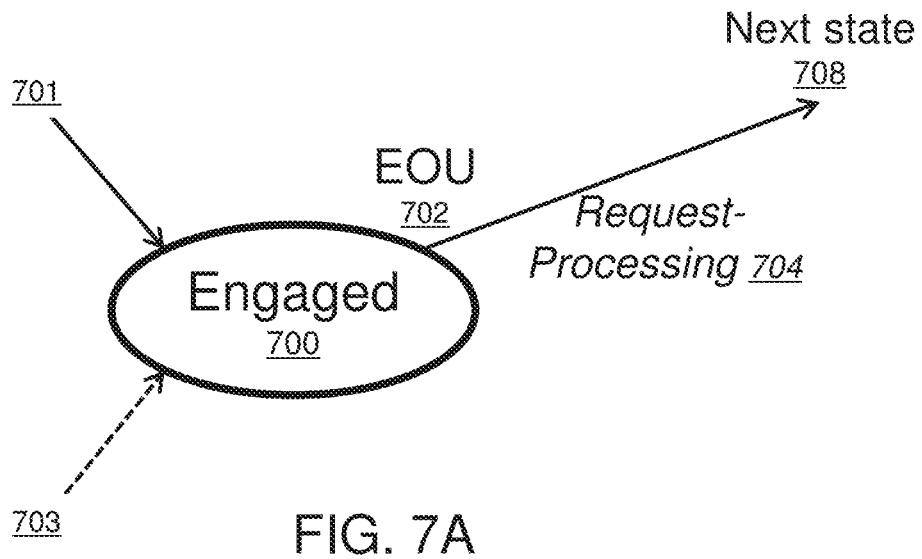
FIG. 7A shows an engaged state and its immediate neighborhood, according to an embodiment.

FIG. 7A only shows an engaged state 700, which can be any kind of engaged state, and one or more received requests 701, 703; see FIG. 6B. State 700 is entered via unlabeled transition(s) from one or more previous states (not shown). In engaged state 700, an EOU indicator 702 triggers request-processing 704, followed by a transition to a next state 708. The next state 708 may be state 700 itself, or any other state in the larger FSA, not shown, which contains state 700. In all its simplicity, FIG. 7A takes advantage of several useful conventions introduced to simplify FSA diagrams.

Modal Dialogs

Figure 7B:
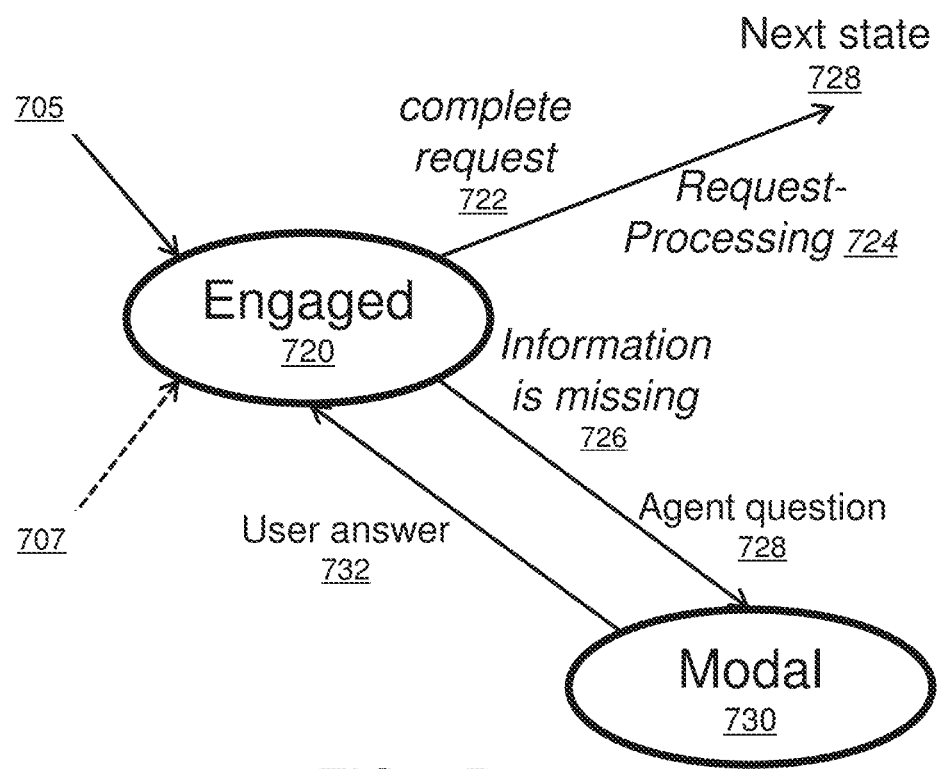
FIG. 7B shows an engaged state with a modal dialog, according to an FSA neighborhood.

FIG. 7B shows a modal state 730 and its corresponding transitions, which allows the use of modal dialogs (see FIG. 1B for an example of a modal dialog). Agents use such dialogs when they lack sufficient information to fulfill a user's request and ask the user to provide the missing information. Disambiguation and slot filling are typical circumstances of this.

FIG. 7B shows the effect of making modal dialogs explicit. When one or more request 705, 707 received in engaged state 720 are complete (and unambiguous), detecting a complete request 722 triggers request-processing 724, as shown, but if the received request is incomplete (or ambiguous), the agent opens a modal dialog by transitioning to the modal state 730 and asking the user a question 728. The user prepares an answer, and the reception by the agent of the user's answer 732 transitions the agent's state back to engaged state 720.

In modal state 730, the user can only answer questions from the agent; further, an agent in modal state 730 can only transition back to engaged state 720. (The more complex situations that may arise in mixed-initiative dialogs are not being discussed here.) A modal dialog may involve several round trips from engaged state 720 to modal state 730. While information is missing to complete the request, transition 726 occurs, and the agent asks another question 728. In modal state 730, the user must answer the question (transition) 732. The agent is clearly engaged during the modal dialog. And since the modal dialog begins and ends in engaged state 720, without other transitions, it is justifiable to collapse the entire modal dialog within an engaged state, which turns out to be identical to engaged state 700 of FIG. 7A. Collapsing a sub-FSA into a single state is a known operation in the theory of automata. The net effect of all this is that the modal dialog of FIG. 7B can effectively be hidden within engaged state 700 of FIG. 7A.

The simplifying convention for all FSAs in this disclosure is that modal dialogs do not need to be shown explicitly, as in FIG. 7B, but they are nevertheless supported in any engaged state, such as state 700. This shorthand, which saves one state and two transitions for each engaged state, is essential in keeping FSAs small without excluding model dialogs.

Request Processing

More technical details, and a corresponding shorthand, apply to request processing. In practice, request processing occurs in a succession of stages. According to an embodiment, an utterance is first transcribed to text using automated speech recognition (ASR). The transcribed text is then processed using natural language understanding (NLU) processing, including parsing and semantic interpretation. This is followed by the execution (a.k.a. fulfillment) of the interpreted request. The agent creates a response and then presents it to the user. In some embodiments, some of these stages may be omitted, coalesced, overlapped, or subdivided. Some or all stages may be performed locally on a device. Some or all stages may be performed on a remote server. Failure at one stage may cause the modification or omission of subsequent stages. In some embodiments, the work may be divided between a device and a server.

All these circumstances suggest that request processing could be represented in a sequence of nodes. In FIG. 7A, request-processing 704 is associated with a single transition from engaged state 700 to next state 708. Although request processing involves multiple stages, it cannot be subdivided if it is executed on a transition. As a step towards greater flexibility, FIG. 7C introduces a new state, which is a request-processing state 750. (In other embodiments, the new processing state 750 could be further divided to expose various stages of request processing.)

Figure 7C:
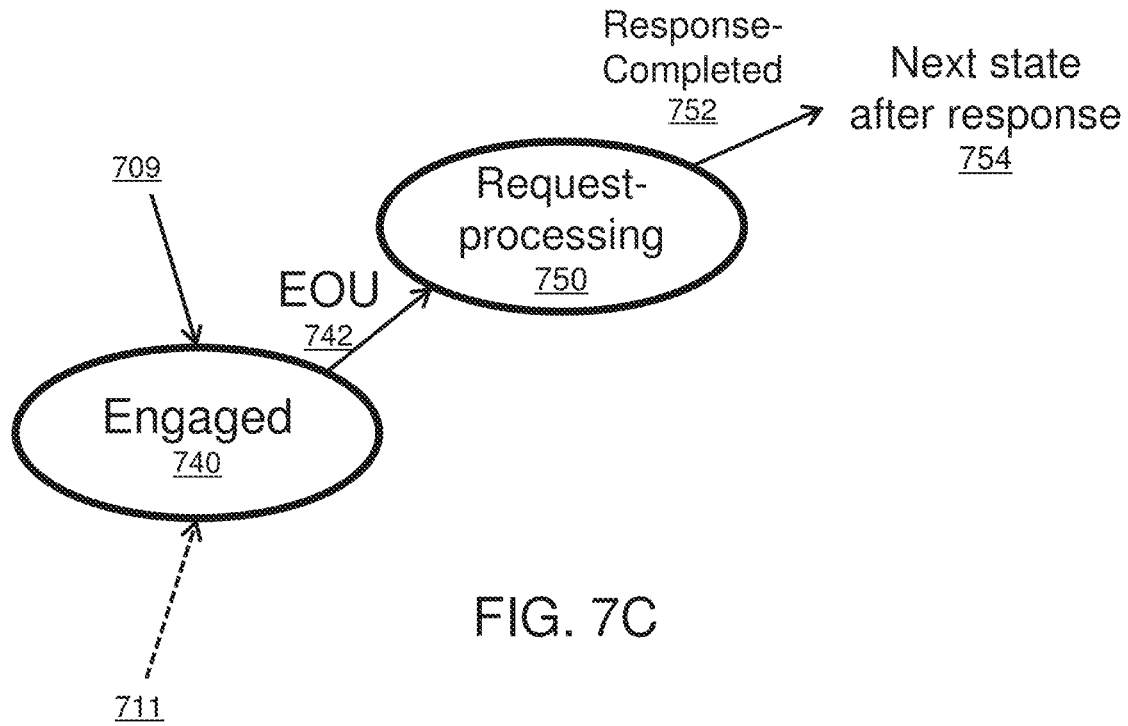
FIG. 7C shows the use of a request-processing state, according to an embodiment.

In FIG. 7C, one or more requests 709, 711 are received and an agent in engaged state 740 (which can be any type of engaged state; see FIG. 6B) also receives an EOU indicator 742 that signals completion of a user request, and it transitions to request-processing state 750, in which it processes the request, creates a response, and presents it to the user. The end of request processing is a response-completed indicator 752.

In some embodiments, the response presented to the user may include one or more of: written text; spoken text created by a text-to-speech module; an audio segment; an image; a video segment; or any combination of the above and other acts of communication, such as a robot answering with a gesture. In some embodiments, the detection of a response-completed indicator 752 may be based on various factors, such as: a minimum duration for displaying textual or visual content on a screen; the actual end of a spoken text segment; the end of an audio or video segment; the end of a gesture; combinations (such as the latest time) of the above; and timeouts or delays applied to any of the above. In some embodiments, the agent's FSA is implemented at least in part on a server, while the presentation of the agent's response is done locally on a user-facing device; in some such embodiments, a response-completed indicator 752 may originate in the device and be sent to the server. In all these cases, the agent remains in state 750 of FIG. 7C until a response-completed indicator 752 is detected; the agent then transitions to next state 754.

The simplifying convention that applies to all engaged states in this disclosure, such as state 700 in FIG. 7A, is that request-processing (transition) 704 may be subdivided to expose separate processing stages, as states and corresponding transitions, such as request-processing state 750 in FIG. 7C, as a first step. More stages can be exposed by subdividing the request-processing tasks more finely.

Compared to FIG. 7C, the shorthand of FIG. 7A saves one state and one transition, for each engaged state, and for each request-processing step exposed as a state. In this situation, the transformation from FIG. 7C to 7A requires the collapsing of a chain of transitions. Specifically, the transition chain consisting of 742 and 752 in FIG. 7C collapses to EOU indicator (transition) 702 in FIG. 7A. During such a transition sequence collapse, request-processing steps are concatenated in the expected order. It will be clear to a person in the field that the same process may be applied using finer subdivisions of the request processing tasks.

Barge-In

In some embodiments of FIG. 7C, the agent may become unresponsive in state 750, and stop accepting new requests, as well as wake-up and other indicators, perhaps because a long response has not completed, so that the response-complete indicator 752 has not yet been triggered. When an agent is unresponsive, users get impatient and will have a bad experience unless the system provides a way to "barge-in" and interrupt the response.

Figure 7D:
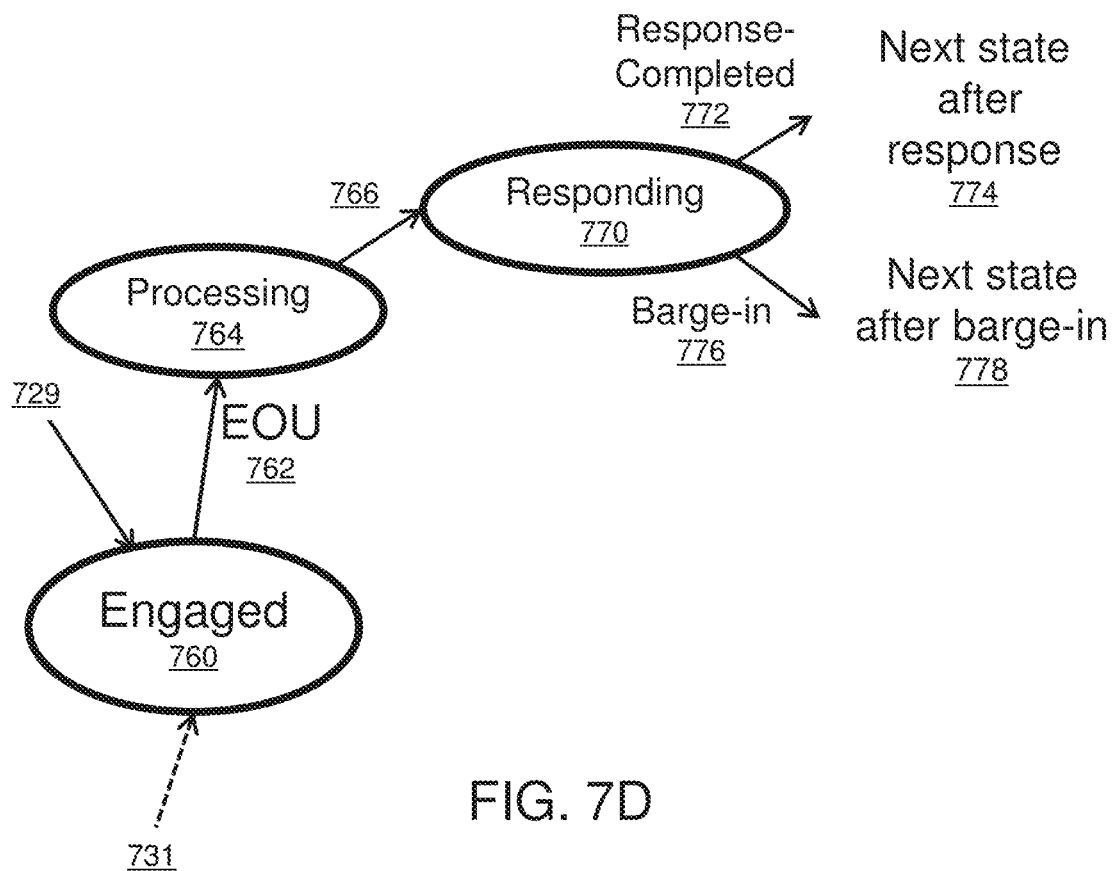
FIG. 7D is an elaboration of FIG. 7C to support barge-in, according to an embodiment.

The FSA of FIG. 7D handles barge-in during the response. It contains a renumbered copy of FIG. 7C, including states and transitions of FIG. 7C, with reference numbers incremented by 20 (i.e., one or more requests 729, 731, engaged state 764, EOU state 762, response-completed state 772 and next state after response 774). In addition, request-processing state 750 is split into processing state 764 and responding state 770; there are also new transitions, including barge-in indicator 776 and an unconditional transition 766 that occurs when request processing is done, minus the responding part. The FSAs of FIG. 7D and FIG. 7C behave essentially the same, with two differences. First, the completion of request-processing in processing state 764 triggers a transition 766 to the responding state 770. Second, detecting a barge-in indicator 776 while in responding state 770 interrupts the responding activity. In the specific embodiment of FIG. 7D, barge-in is supported as soon as processing ends, during the entire time a response is being presented to the user. Some embodiments support barge-in at earlier or later stages.

The criteria that define a barge-in indicator vary with the embodiment. The most common way to barge-in is when the new user's voice is loud. While an agent is making sounds, the barging user's voice must be heard above the agent's own audio output. In some embodiments, it is sufficient for the user's voice to be loud enough to cause the agent to immediately mute its audio output. In some embodiments, echo cancellation is used to emphasize the user's speech by attenuating the echo (the agent's audio output).

In some embodiments, user speech input can be both a barge-in indicator and the beginning of an utterance; in some such embodiments, the next state after barge-in 778 is an engaged state, and the utterance is processed immediately as a request.

Some embodiments support barge-in indicators other than speech sounds. As with other indicators, barge-in indicators include user actions such as taps, swipes, clicks, gestures, etc., or other conditions that the agent can detect autonomously—like the user stepping into or out of a specific region of space.

In the rest of this disclosure, in order to keep the generic FSAs small, the possibility of barge-in is not considered explicitly; but it is understood that barge-in options can be combined with the disclosed FSAs. Specifically, embodiments of FIG. 7D, and the variants thereof, may be considered variations of FIG. 7C, itself a variation of the compact scheme of FIG. 7A, in which a single engaged state may stand for a variety of more detailed FSAs.

The rest of this disclosure uses compact FSAs, in which all the tasks of processing a request, creating a response for the user, and showing it to the user are performed on a single transition, as a request-processing element. This saves at least one state for each request-processing transition. It is understood that the expansion of such transitions, and all considerations associated with FIGS. 7C and 7D, are applicable to the FSAs described below.

Stream Processing (a.k.a. Incremental Processing)

Some embodiments are stream-oriented. In a stream-oriented (a.k.a. incremental) embodiment, one or more stages of request processing execute in parallel, typically in a multi-threaded fashion. Different processing stages may overlap in a pipeline, where the output of one stage is the input to the next.

In a fully incremental embodiment, all stages of ASR, parsing, and interpretation can overlap. Such an embodiment requires an incremental parser, and the processing of an utterance (an input speech audio stream) begins before the EOU is encountered. When successive stages of processing (ASR, parsing, interpretation) overlap in time, the beginning of the speech utterance is processed before the EOU occurs.

Stream-oriented embodiments require a modest adaptation of the FSAs described so far, such as those in FIGS. 7A and 7C. In such embodiments, request processing does not wait for an EOU, in contrast with sequential embodiments, where an EOU indicator triggers request processing. Here, request processing begins earlier, and perhaps as soon as an utterance begins. Technically, treating the early beginning of the processing as the actual EOU indicator is sufficient to adapt the FSA framework used in this disclosure to stream-oriented (incremental) embodiments. Hence, this disclosure also covers stream-oriented embodiments, with no change other than a small stretch in the definition of the EOU indicator.

To summarize the shorthand notations and conventions used in this disclosure to allow the use of compact FSA engaged states such as shown in FIG. 7A:
- modal dialogs are handled as described in FIG. 7B;
- stages of request processing may be introduced as described in FIG. 7C;
- barge-in is supported as described in FIG. 7D;
- stream-oriented (incremental) embodiments are also supported.

Engagement Policy FSAs

Several engagement policies are discussed below. The policies are mainly described using one or more corresponding FSAs. A simple engagement policy is included for reference and comparison purposes. Several non-traditional policies are presented using one or more corresponding FSAs:

1) The one-time engagement policy is well known; it leads to wakeword fatigue, providing a motivation for creating other policies;
2) Locked engagement policies give a user explicit control over engagement, using requests to lock and unlock an agent's engagement state;
3) Reserved agent policies allow a user to gain control of an agent for a limited period of time, and ignoring other users; and
4) Attentive agent policies allow an autonomous agent to make engagement and disengagement decisions; and
5) Hybrid policies integrate locked engagement and attentive agent policies. In particular, a user can override an agent's autonomous behavior.

Each policy FSA has many possible embodiments. Each represents a family of policies of the same type. Policy types and their associated FSAs determine engagement behaviors.

One-Time Engagement

Figure 8:
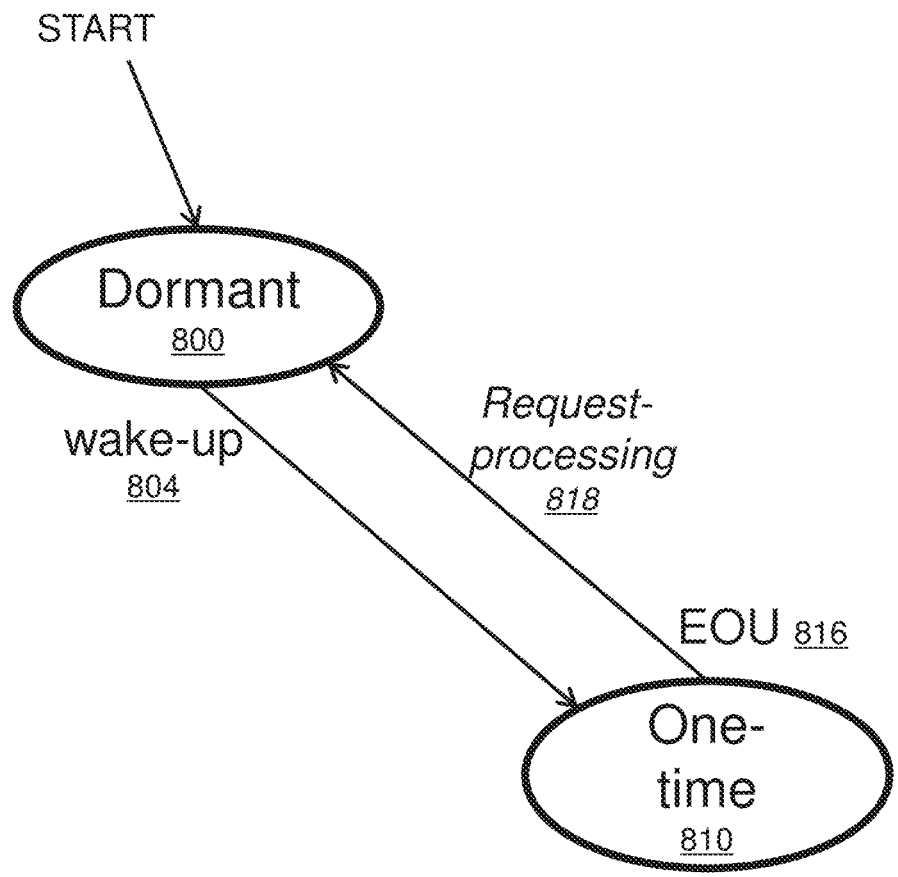
FIG. 8 shows an engagement FSA, according to an embodiment.

The FSA in FIG. 8 illustrates an engagement policy used in some virtual assistants. This FSA has a dormant state 800, and a one-time state 810. A dormant agent responds to a wake-up indicator 804, such as a wakeword, by transitioning to the one-time state 810, in which it can process a single user request. Detecting an EOU 816 while in the one-time state 810 causes the agent to launch request-processing 818. The agent immediately returns to dormant state 800. A new wake-up indicator 804 is required before another request can be processed, which leads to a poor user experience, and wakeword fatigue.

Locked Engagement Policy

A locked engagement policy gives users explicit control over locking and unlocking an agent's engagement. While locked, an agent does not require a wake-up indicator.

Unconditional Locking

Figure 9A:
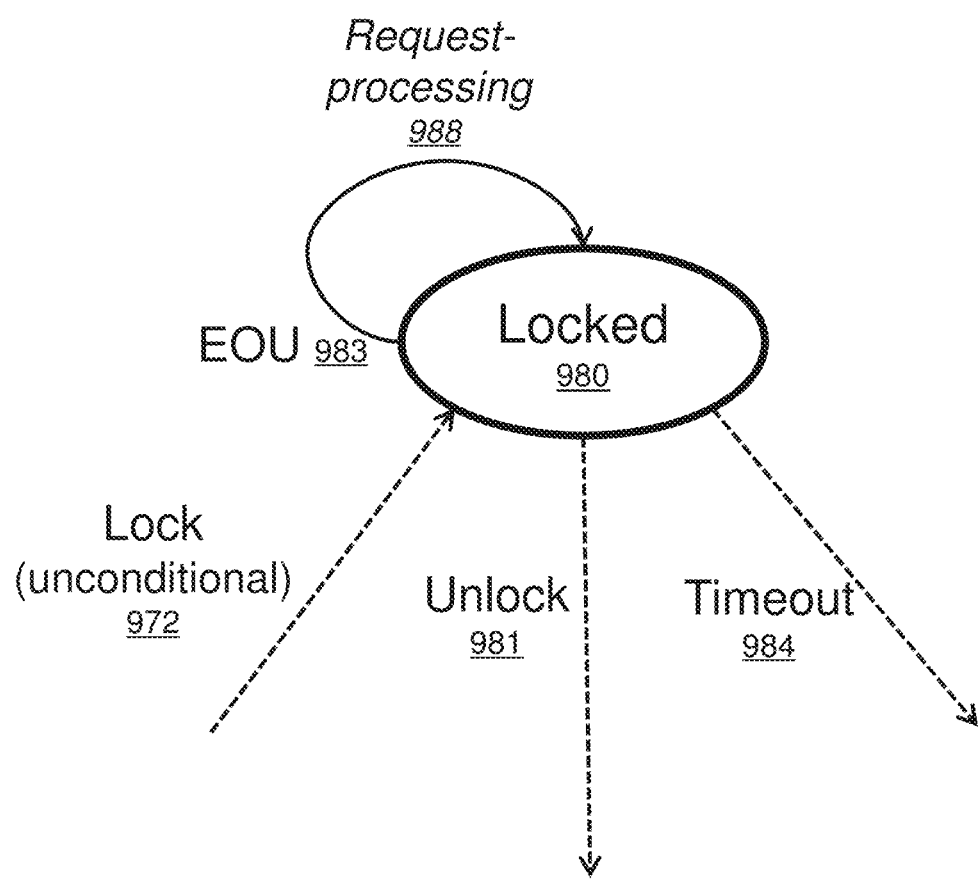
FIG. 9A shows an unconditionally locked state and its immediate neighborhood, according to an embodiment.

FIG. 9A shows a diagram of unconditional locking, according to an embodiment. It only shows a small portion of a larger FSA consisting of a locked state 980 and transitions to and from adjacent states. Locked state 980 is entered following a Lock indicator 972, which is unconditional. The behavior of the FSA in locked state 980 is simple. Upon detecting an EOU 983, the agent performs request-processing 988 and returns to locked state 980. Thus, the agent can process successive requests without a need for a wakeup indicator, until detecting either an Unlock indicator 981 or a Timeout 984. In FIG. 9A, timeouts and Unlock indicators are shown separately, but when both transitions go to the same state, it is possible to merge timeouts with Unlock indicators.

In some embodiments, Lock indicator 972 must be an explicit user action, such as a natural language spoken request or an unambiguous reserved gesture. This avoids the possibility of locking the agent inadvertently. Since at least one Unlock indicator 981 is available, the risk of sharing the fate of King Midas is eliminated.

In some embodiments, Lock indicator 972 is a natural language request. Possible Lock requests include, e.g., "Pay attention," "Let's start," or "Listen."

In some embodiments, Unlock indicator 981 is a natural language user request. Examples of possible Unlock requests include, e.g., "We're done" or "Dismiss" or "Break" or "Thanks".

Conditional Locking

Since they use natural language, Lock requests can be quite expressive. Instead of locking the agent unconditionally, as in "Listen," a Lock request can specify a locking condition, as in "Listen to adults." Generally, the use of a locking condition can give a user more precise control over locked engagement.

Figure 9B:
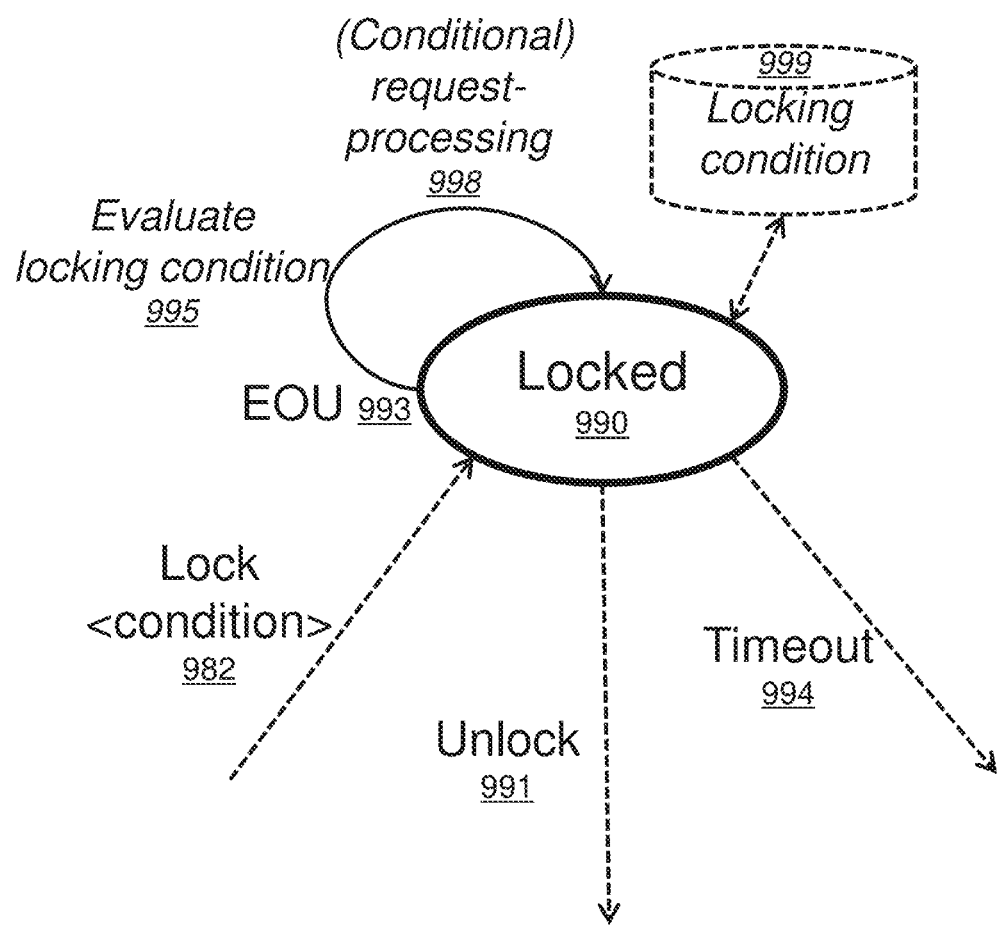
FIG. 9B shows a conditionally locked state and its immediate neighborhood, according to an embodiment.

FIG. 9B shows a diagram of conditional locking. The FSA of FIG. 9B behaves like the FSA of FIG. 9A, but with important differences. Lock indicator 982 has an associated "locking condition" 999, which is a predicate (i.e., it evaluates to a Boolean value). The locking condition 999 is stored in a persistent memory for subsequent use by the agent.

In locked state 990, a locking condition 999 has been specified, and the agent performs conditional processing of successive requests without a need for a wakeup indicator. The agent continues to perform conditional processing of requests until an Unlock indicator 991 or Timeout indicator 994. Following an Unlock indicator or Timeout, the agent exits Locked state 990. Conditional processing of a request means that (a) the specified locking condition 999 is evaluated first; and (b) the request is processed, if the locking condition is satisfied. If the locking condition is not satisfied, the request is ignored.

Locking condition 999 is stored in a format that can be evaluated when needed by the agent. In various embodiments, the locking condition 999 is stored as a dynamically loadable library, interpretable code, or another data format that the agent can interpret to evaluate the locking condition. In some embodiments, the condition may be the presence in the environment of external, real-world objects (including people) and their properties, as determined by the agent's sensory input and perceptual analysis thereof. In some such embodiments, the locking condition also depends on internal variables of the agent's software such as, e.g., the time elapsed since the last request, or the complex state maintained by a scene analysis module that keeps track of objects (including people) and their properties.

Conditional request-processing 998 operates as follows. Upon detecting an EOU 993 that marks the end of the current request, the agent evaluates 995 the locking condition 999. If the resulting value is False, the agent bypasses the conditional request-processing 998 and returns to locked state 990 without processing the request. If the value of locking condition 999 is True, the conditional request-processing 998 occurs, then the agent returns to locked state 990. In FIG. 9B, timeout indicator 994 and Unlock indicator 991 are shown separately, but when these two transitions go to the same state, a timeout as just one type of Unlock indicator. Further details are given in conjunction with FIG. 11.

The association of a locking condition with a Lock indicator 982 is optional. If a Lock request does not explicitly specify a locking condition, locking condition 999 will be treated as True. In this case, the FSA of FIG. 9B behaves as that of FIG. 9A. Unconditional locking can be treated as a special case of conditional locking, where the locking condition 999 is True. Alternatively, the case of an absent condition can be excluded from conditional locking, in which case FIG. 9A and FIG. 9B represent different scenarios.

Locked Engagement FSA

Figure 9C:
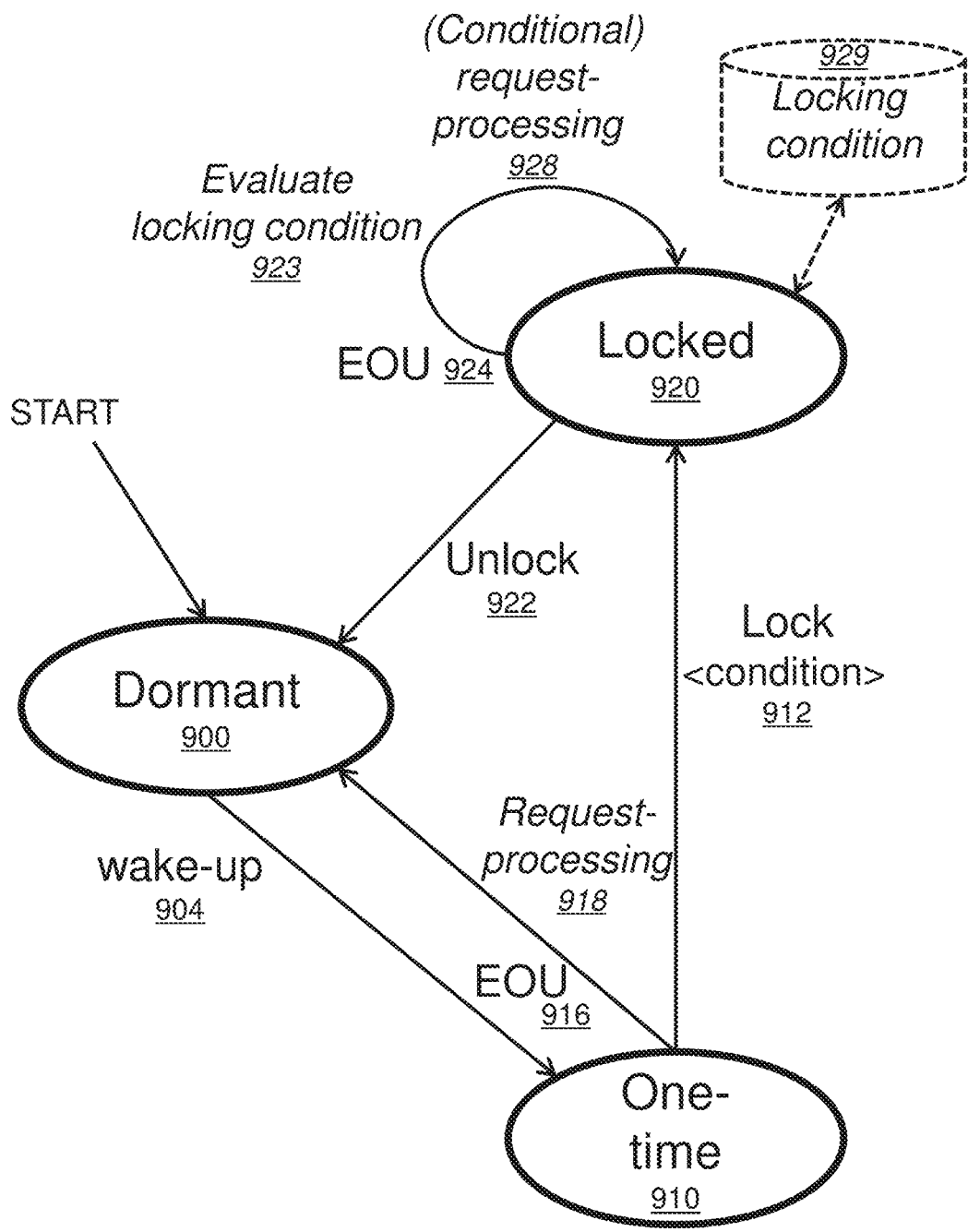
FIG. 9C shows an FSA with a conditionally locked state, according to an embodiment.

The locked engagement policy illustrated in FIG. 9C provides a simple way to "lock the agent's attention" and avoid the use of a wakeword for an indefinite amount of time until an Unlock indicator 922 is detected. The FSA of FIG. 9C is the result of combining a renumbered copy of the simple FSA of FIG. 8 with a renumbered copy of the FSA elements of FIG. 9B to create a complete locked engagement FSA. Timeout indicator 994 of FIG. 9B has been merged with Unlock indicator 922 to simplify the FSA.

The behavior of every part of the locking engagement FSA of FIG. 9C was described earlier regarding FIG. 8 or FIG. 9B. In dormant state 900, a wake-up indicator 904 causes a transition to one-time state 910, and in that state, an EOU indicator 916 triggers request-processing 918, which is followed by a return to dormant state 900, except when a Lock indicator 912 is detected. The detection of a Lock indicator 912 causes, instead, a transition to locked state 920. In the locked state 920, following an EOU indicator 924, a new request is processed 928 if the locking condition is satisfied 923. Conditional request processing is performed repeatedly without exiting the locked state, until the detection of an Unlock indicator 922 causes a transition back to dormant state 900.

Lock and unlock indicators may be reserved gestures, reserved sounds, or any event that an agent can recognize based on its sensors and perceptual intelligence, its other inputs, and its internal state. An important case of Unlock indicator 922 is the use of a timeout. Another important special case that applies to both Lock indicator 912 and Unlock indicator 922 is the use of a natural language request to lock or unlock an agent's state. Spoken lock and Unlock requests are of high interest, both because they rely only on spoken communication, providing hands-free behavior, but because these requests can be refined to provide more control. Note that natural language Lock requests are recognized during request-processing 918, but when these special requests are recognized, they direct the next transition towards the locked state 920, instead of dormant state 900. For full technical correctness, FIG. 9C could make this clearer by decomposing request-processing 918, as done in FIG. 7C, to expose the transitioning to either the locked state 920 or the dormant state 900 from a new request-processing state 918, akin to state 750 in FIG. 7C. Similarly, natural language Unlock requests are recognized during request-processing 928, and full technical correctness would require introducing a state akin to state 750 in FIG. 7C. But these are simple enough technicalities, and the meaning of FIG. 9C is clear without adding complexity to the FSA.

Additional Lock/Unlock Transitions

Figure 9D:
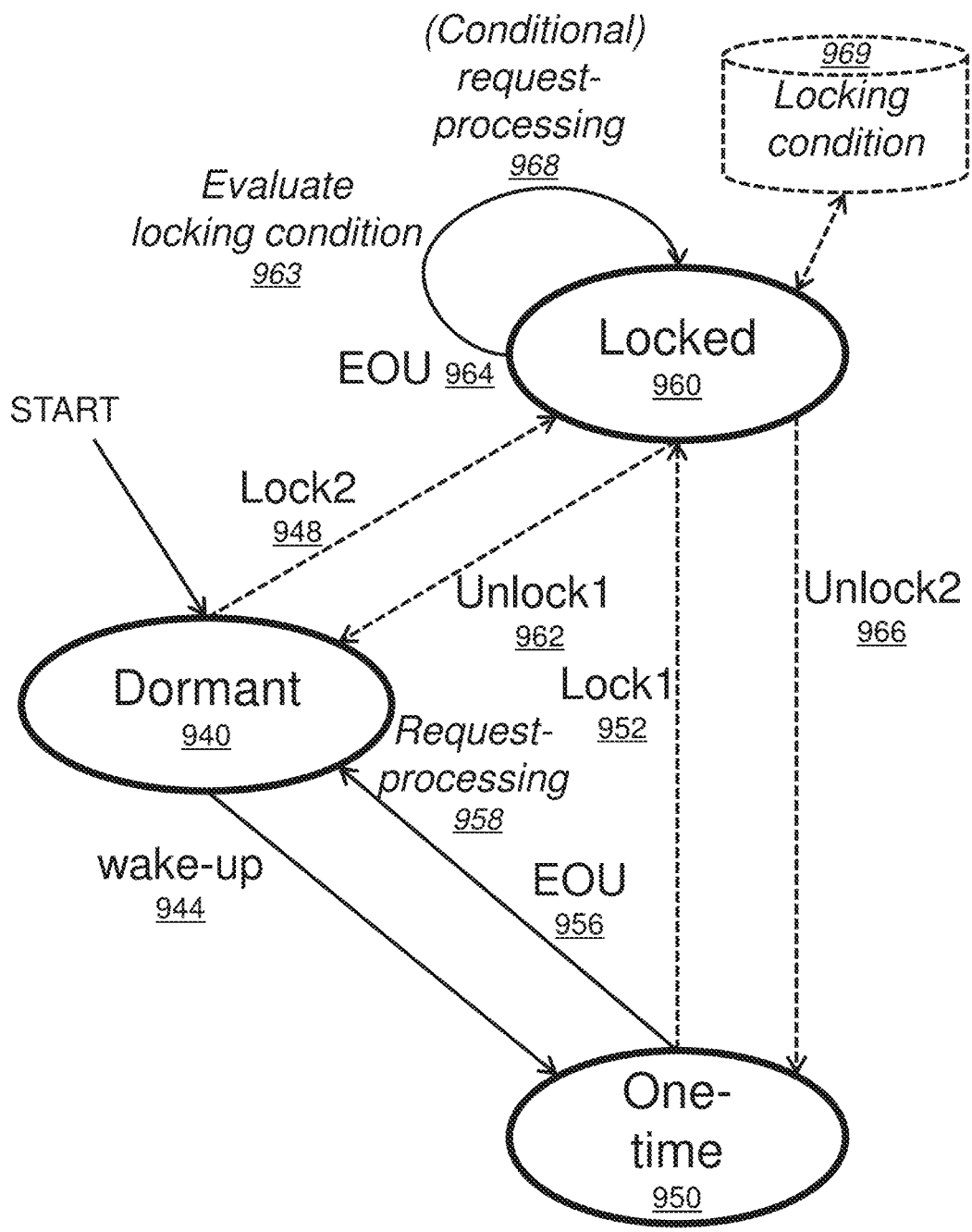
FIG. 9D shows variations of the FSA of FIG. 9C, according to an embodiment.

FIG. 9D is a renumbered copy of FIG. 9C, with new lock and unlock transitions. FIG. 9D illustrates EOU 956 (which is similar to EOU 916 of FIG. 9C), request-processing 958 (which is similar to request-processing 918 of FIG. 9C), EOU 964 (which is similar to EOU 924 of FIG. 9C), conditional request-processing 968 (which is similar to conditional request-processing 928 of FIG. 9C) and locking condition 969 (which is similar to locking condition 929 of FIG. 9C). Indicators Lock2 948 and Unlock2 966 are added to pre-existing lock/unlock indicators from FIG. 9C, Lock1 952 and Unlock1 962. The behavior of the FSA of FIG. 9D is the same as that of FIG. 9C, except for the additional indicators, whose effect is self-explanatory. In FIG. 9C, all four lock and unlock transitions become optional, a fact expressed by showing them with dashed lines. Examples of uses of the additional indicators will be given after some analysis.

The set of Unlock indicators is the union of indicator sets Unlock and Unlock2. Since the FSA must be deterministic, the sets Unlock1 962 and Unlock2 966 are disjoint. In FIG. 9C or FIG. 9D, Unlock1 922 and Unlock2 962 transition to a dormant state. In FIG. 9D, Unlock (indicator) 966 transitions to one-time state 950. All these unlock indicators can be spoken requests, such as the user saying, "Thank you" or "Stop" or "Dismiss" or "Bye" or "Unlock." When gesture recognition capabilities are available, specific user gestures such as turning one's body away from the agent, or a specific hand gesture, or a full-body gesture such as exiting a region of space, can also be Unlock indicators.

Unlock indicators can also be timeouts. In some embodiments, a timeout event may occur when a specified amount of idle time has elapsed between requests, without the user issuing a request or taking any action. In some embodiments, a timeout occurs when a specified total amount of time has elapsed since first entering the locked state. Timeouts are indicators that are not initiated by a user. Timeouts are not always shown explicitly in the FSAs in this disclosure, as they are counted among the Unlock indicators, but the possibility of their use is always assumed.

The set of lock indicators is the union of indicator sets Lock1 952 and Lock2 948. Sets Lock1 952 and Lock2 948 of indicators can be chosen arbitrarily (in particular they can overlap) except that Lock2 (indicators) 948, that are recognized in dormant state 940, cannot be spoken requests; engaged states alone are capable of request processing. Hence, Lock2 (indicators) 948 may only consist of reserved sounds or reserved gestures; in contrast, Lock1 (indicators) 952 can benefit from the expressive power of natural language request. If Lock2 is non-empty, the activity of dormant state 940 includes detecting both wake-up 944 indicators and Lock2 948 indicators.

Dormant State Logic

Figure 10:
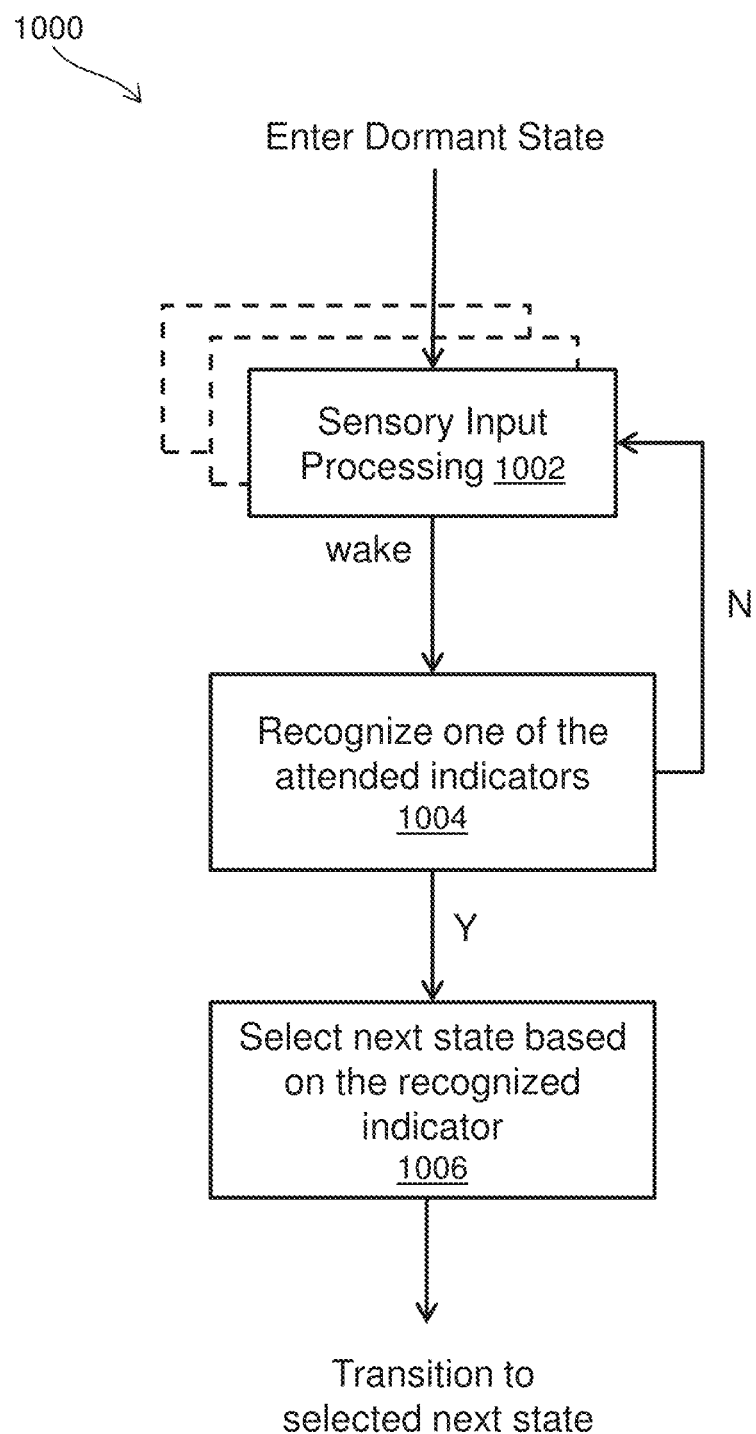
FIG. 10 shows the logic in a dormant state, according to an embodiment.

This section describes dormant state logic before returning to the topic of locked engagement. FIG. 10 is a description of dormant state logic 1000; it is intended to apply broadly to all dormant states. The discussion follows that of FIG. 9D, where a dormant state 940, having more than one indicator and more than one next state, calls for a more general expression of the dormant state logic 1000.

A dormant agent does not process spoken requests, but it must actively monitor its inputs in order to detect all allowed transitions. In a dormant state such as, e.g., dormant state 940, a speech-enabled agent must at least monitor its audio input in order to detect wakewords like "Hey Siri" or "OK, Google." In some embodiments, there is more than one wakeword. In some such embodiments, different wakewords may result in the same transition, or in different transitions.

A wakeword is usually detected by a word spotter, which continuously monitors its audio input in order to match one of a predetermined set of wakewords. The computational requirements for fast word-spotting techniques are modest by current standards. In some embodiments, a user-facing device has sufficient computational resources to implement word spotting locally, avoiding both communications costs and latency that a server-based implementation would entail.

In some embodiments, the only sensor is a microphone, and wake-up indicator(s) are wakewords. Sensory input processing 1002 thus performs word spotting on the input audio, for one or more wakewords. Such processing is typically carried out at periodic intervals, based on a fixed duty cycle. For the lowest latency, the duty cycle can be as short as a single audio sample, but the computational costs are excessive. Duty cycles for audio processing are typically much longer, such as, e.g., 10 ms to 100 ms (100 Hz down to 10 Hz). During a duty cycle, after sensory input processing 1002, if step 1004 fails to recognize any of the attended wakewords (N exit branch), sensory input processing 1002 continues during the next duty cycle. If a wakeword is recognized in step 1004 (N exit branch), step 1006 selects a state transition associated with the recognized wakeword, and the transition to the corresponding next state is performed.

In other embodiments, alternative wake-up indicators, such as reserved gestures or reserved sounds, are used in addition to, or instead of, wakeword indicators. Such alternative wake-up indicators belong in various modalities, each having their own types of processing and duty cycles. For example, detecting keyboard presses, mouse clicks, touch screen taps, swipes, special sounds, and events based on gaze direction belong in different modalities, each of which can be used as an indicator. (Similar remarks apply to other indicators.)

An indicator can also be based on a conjunction of simpler indicators; for example, making eye contact and starting to speak at the same time could be treated as a wake-up indicator. Further, different indicators may cause transitions to different states. FIG. 9D offers an example, where a Lock2 indicator transitions to locked state 960, vs. a (different) wake-up indicator that transitions to one-time state 950.

With the use of multiple sensory input processing (tasks) 1002 (shown in FIG. 10 by dotted boxes and lines), an indicator can be detected using a processing task (part of processing 1002) that is most appropriate to its modality and the specific indicator. A number of sensory input processing 1002 sub-tasks may thus be running—in parallel or series, depending on the specific embodiment. In some embodiments, different modalities have different duty cycles for their sensory processing. The failure of step 1004 to recognize an indicator using any of the subtasks of the sensory input processing 1002 results in continuing sensory input processing 1002. Conversely, the success of any of the parallel recognition tasks (steps 1002 and 1004) results in success of the dormant state's scanning for an attended indicator. Once an attended indicator is identified, a predetermined transition takes the agent to the next state.

In some embodiments, some or all sensory input processing tasks 1002 are delegated to a server or another device. In some embodiments, communications costs and latency are minimized when the detection of indicators is implemented locally, rather than on a remote server. A fairly low latency in event detection is important for a good user experience. Many design variations and optimizations can be used, dependent on modalities, local processing power, local networks, availability of remote servers and more.

Use of Unconditional Locking

In FIG. 9C, Lock indicator 912 can be an unconditional Lock request (such as, say, "Listen"). An unconditionally locked agent processes all requests until detecting an Unlock indicator. When locking condition 929 is set to True, the FSA of FIG. 9C implements unconditional locking. In this case, the evaluation 963 of the locking condition always returns True, and request-processing 928 always occurs. It would be possible to draw a simplified version of FIG. 9C, based on FIG. 9A instead of FIG. 9B, but that is not necessary since unconditional locking can be treated as a special case of conditional locking. Examples of possible unconditional Lock requests include such phrases as "Pay attention," "Let's start," or "Listen." Examples of Unlock requests include, e.g., "We're done" or "Dismiss" or "Thanks."

Unconditional locking is very important in practice because it is so simple, yet does much to address the issue of wakeword fatigue. Unconditionally locked engagement provides great value by allowing an arbitrarily long sequence of requests to be processed without intervening wake-up indicators.

The benefits come at a small cost. There is some overhead for bracketing the locked sequence of requests with a Lock/Unlock pair of indicators, such as saying "Pay Attention" and "Dismiss" to delimit the beginning and end of the period of locked engagement. This overhead is negligible if the sequence of locked requests is long enough. Since the user has control over this trade-off when deciding whether to lock state or not, it is not an issue. The naturalness of locked engagement control is not much in question either, provided good choices are made for natural language Lock and Unlock requests; the idea of locking, per se, is very natural. Other natural and meaningful Lock/Unlock indicator pairs will be discussed below.

Use of Conditional Locking Conditions

Being expressed in natural language, Lock requests can be very expressive. The use of a locking condition 929 can give the user much control over engagement. Broadly speaking, an NLU system can recognize a custom sub-language (or "mini-domain") of Lock requests that express complex locking conditions. A simple schema could take the form "Listen <NL-condition>" where a wide variety of <NL-condition> natural language expressions can specify a variety of useful locking conditions.

Unconditional locking keeps the agent in a locked state for any user addressing it, but this is not always ideal. For example, a Lock request such as, e.g., "Listen to me" is a Lock indicator 912 that "locks" the agent for the benefit of the user making the request (herein called the reference user), to the exclusion of all other users. The reference user becomes, in effect, the only user receiving the agent's attention.

In some embodiments, the agent builds a characterization of the reference user (e.g., a reference characterization) at the time of the first request. At the time of a second request the agent builds a characterization of the new user (e.g., a new characterization). The agent attempts to match the first characterization to the second characterization. If there is an insufficient match, the agent ignores the second request.

In some embodiments, locking to a reference user may be achieved based on speech audio using voiceprints. The agent may attempt to match the voiceprint computed from a request's audio against the voiceprint of the reference user to decide whether to process a second request. The agent processes the request only if there is a sufficient match between the voiceprints. Voiceprints are only one of many ways to check whether a request is from the reference user.

Instead of either all users or a single user, other variants of locked engagement may involve specified sets of users. For an example of a more complex locking condition, the locking request "Listen to adults" could restrict locked engagement to adults, to the exclusion of children. The locking condition specifies a voice class—the 'adults' voice class. Checking that the locking condition is satisfied could be implemented, in an embodiment, based on the output of a 3-way voice classifier whose output recognizes, for example, three voice class hypotheses: children voices, adult male voices, and adult female voices. Additional voice classes could also be identified based on, for example, dialect, toddler, teenager, etc. In such an embodiment, a voice class (such as 'adults') specified by a locking condition can be matched with a voiced class hypothesis from a voice classifier. In some embodiments, other sensory modalities can also contribute to the evaluation of the locking condition, such as a visually-based distinction between children and adults.

For a different example of a Lock request, "Listen for three minutes" would create a locking condition 929 that specifies a timeout for the period of time to be spent in the locked state 920. If the timeout is reached, an Unlock indicator 922 is triggered. An Unlock request makes the timeout moot by exiting the locked state early.

In this embodiment, a subsequent Lock request ("Listen for five minutes") can reset the timer, and a lock extension request like "Listen for five more minutes" could adjust the timer.

Complex conditional Lock requests include compound requests, in which multiple conditions are combined, for example, "Listen to the adults in the kitchen" or "Pay attention to me until 11 am, as long as I am standing up." The implementation, like that of general NLU systems, requires a parser-interpreter to recognize the natural language and to convert it to an actionable form—in this case, a locking condition 929. As indicated, a locking condition is evaluated in the environment of a request, to decide if the request will be executed.

For example, the satisfaction of the locking condition for "Listen to the adults in the kitchen" depends on satisfying two simpler conditions: (1) a speaker is identified as an adult (this could be determined using a voice classifier, visual scene analysis, or a combination of the two); (2) the speaker is in the kitchen (this dimension of scene analysis can be based on any number of sensors, including microphone arrays, cameras, and other sensors). Similarly, satisfying the locking condition for "Pay attention to me until 11 am, when I am standing up" depends on satisfying three simpler conditions: (1) the speaker is identified as me; (2) the time is earlier than 11 am; and (3) I am standing up. Condition (1) expresses user continuity, a topic discussed below. Condition (2) is based on accessing current wall time. Condition (3) involves a specific aspect of Scene Analysis, the recognition of posture.

In some embodiments, conditions are based on spatial factors; this is discussed in a later section. Other distinctions may be made. For example, only people who carry a badge giving them certain credentials could be allowed to place requests or cause certain actions.

Extrapolating from these examples, it is clear that a language for the expression of locking conditions should include access to perceptual information (such as various aspects of scene analysis) as well as system state information. To tell if someone is in the kitchen, microphone(s) or camera(s) or other sensors can contribute, as part of a scene analysis subsystem that can estimate the location of a speaker against known kitchen boundaries. Similarly, an adult/child distinction could be based not just on a voice classifier output, but on a height measurement extracted from visual data, and on visual features such as face recognition, or object tracking.

Locked State Logic

Figure 11:
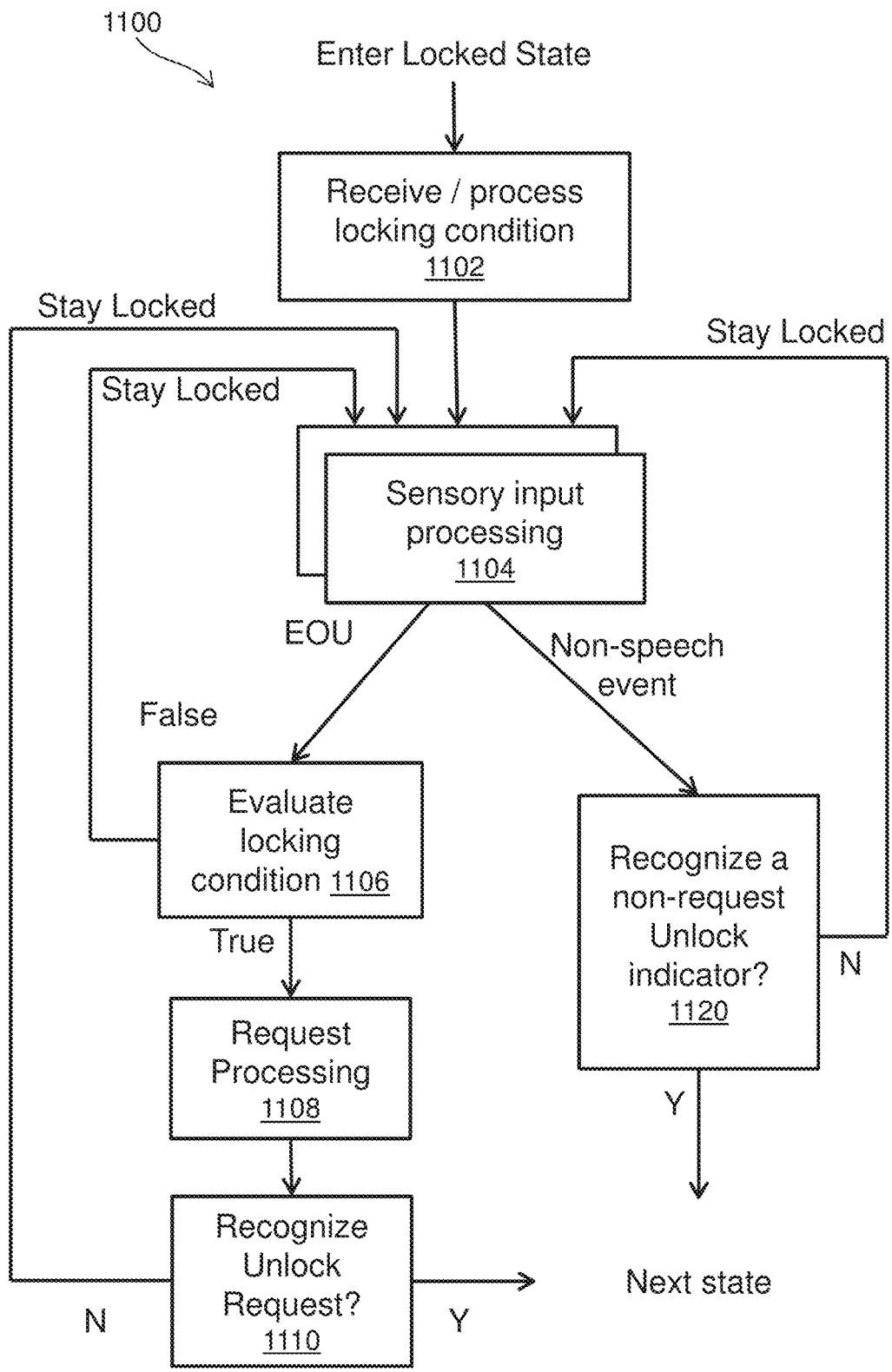
FIG. 11 shows the logic in a locked state, according to an embodiment.

FIG. 11 shows the logic 1100 that is used in a locked state, such as the generic locked state 990 of FIG. 9B. The same logic applies, mutatis mutandis, to specific instances of locked states, such as states 920 of FIG. 9C, 960 of FIG. 9D, 1620 of FIG. 16A and 1670 of FIG. 16B. In locked state 990 (FIG. 9B), a locking condition associated with a Lock indicator 982 is received in step 1102 (FIG. 11), optionally processed, and stored as Locking condition 999. Some format changes or processing may be involved before the condition is stored. In some embodiments, a stored locking condition 999 refers to data that the agent stores separately; for example, if the locking request is "Listen to me", and a voice match will be used to check that a new user's voice matches that of the reference user, speech audio from the reference user is used in step 1102 to create a reference voiceprint.

The next step 1104 involves sensory input processing. The pre-processing of input speech, and the processing of other input events are carried out independently, each with its own duty cycles. The goal is to attend to a number of possible indicators simultaneously. Single-threaded and multi-threaded implementations exist for the required simulated parallelism. This is similar to the logic discussed in conjunction with FIG. 10 for Sensory Input Processing 1002. Events that the agent can detect in step 1104 include EOU's, and other events, comprising external events and internal events such as timeouts. To simplify explanations, timeouts are treated as if they were "sensory" inputs.

If an EOU event is detected, completing a spoken request, the evaluation 1106 of the locking condition takes place. If the result is True, request processing 1108 occurs. If the request is recognized 1110 as an Unlock request, the agent transitions to a corresponding next state, that is not locked. Otherwise, the agent remains in locked state 990 and continues to process step 1104 its sensory inputs. In some embodiments, step 1104 of processing sensory inputs includes updating the reference user voiceprint; in other words, the voice model of the reference user improves and adapts as more speech input is collected.

If a non-speech event is detected in step 1104, the agent checks (1120) if an Unlock indicator 991 or a Timeout indicator 994 is recognized. If yes, the agent transitions to a corresponding next state. Otherwise, the agent remains in locked state 990 and continues to process its sensory inputs. In some embodiments, step 1104 of processing sensory inputs includes updating a reference user's position (based on, say, azimuth and distance from one or more points of view) and other scene analysis parameters. Hence, the scene analysis description of the reference user improves and adapts as more speech input is collected.

The evaluation 1106 of the locking condition can take different forms. If the locking request is "Listen to me," the locking condition 999 requires that the reference user (who uttered the Locking request) and a new user (who utters a new request in the locked state) be the same person. This condition is called user continuity.

User Continuity

Finding whether a new user is the same as a reference user is of great interest, for example, in the implementation of the "Listen to me" Locking request. If an identity match is found between the user producing a new utterance, and a predetermined reference user, the user continuity condition succeeds; if not, a user discontinuity is observed. Although testing user continuity is useful with a locking command such as "Listen to me" the same functionality has further uses in other policies.

In some embodiments, the only input is a microphone. To test user continuity, a voice match is used to see if a new user's voice matches that of the reference user. This is done with voiceprints. Speech audio from the reference user has been stored or used in step 1102 to create the needed reference voiceprint. The beginning and end of a new utterance by a new user are detected by a VAD is used in step 1104, and a new user voiceprint is computed. To test user continuity, evaluation 1106 compares the voiceprint of the new user with that of the reference user.

The use of voiceprints is essential when a microphone is the only input. But when additional sensors are available, many additional techniques can contribute to the testing of user continuity. Many cues can discriminate between the reference user and other users—or between authorized users and all others. For example, azimuth detection can use one or more microphones or one or more cameras, and visual and auditory information can often be combined for greater accuracy. Generally, all aspects of scene analysis, which may involve many sensors, many features, and feature fusion across sensors, can become relevant.

In some embodiments, one or more cameras are used, and an agent can track the reference user using computer vision techniques. In some embodiments, cameras and other sensors allow the identification of users. Microphones and cameras can tell the ID of who is speaking. When such user IDs are known, the problem of user continuity becomes trivial.

Without user IDs, user continuity can be approached with matching techniques, tracking techniques, or a combination of both. In some embodiments, an agent can tell with high confidence whether a new user has the same identity as the reference user, based on the agent's sensory and perceptual capabilities. Multiple sensors, DSP layers to extract relevant features, machine learning and classification techniques, voice analysis, auditory scene analysis, visual scene analysis, and more, may answer perceptual questions needed to solve the user continuity problem, using matching, tracking or both.

Matching

The matching approach refers to comparing two users, to decide whether they are the same or not, using available perceptual features. For example, two users that have different colored shirts, or that do not have the same height when standing, are likely to be different. These features do not change easily. According to an embodiment, the agent can recognize some garments of every user, which is especially useful if other people nearby do not wear similar garments (as would be when a sports team meets). This can involve color, shape, texture and more.

If all perceptual features being extracted match to a "sufficient" degree, the two users are considered matching. In some embodiments, "sufficiency" is determined by using different thresholds, one for each feature, and taking the "and" of the sufficiency outcomes. In another embodiment, match scores computed for each feature are combined to get an overall score that is compared with a single threshold. Techniques of Bayesian sensor fusion can provide a more systematic treatment of this situation. In all cases, at least one threshold is involved to make a yes-no decision.

When used, matching compares features of the new user, gathered at the time of the new request, with features of the reference user. In some embodiments, the sensory signals include audio and visual data, that may be used for a voiceprint match, a face recognition match, and body features based on, e.g., approximate location (distance measurement and azimuth measurement), body shape and size, garment colors and textures, and accessories.

To be fully effective, a degree of match should be affected by the diversity of data among nearby users. Members of the same sports team, for example, will be hard to tell apart by clothing, but easy to tell apart from members of an opposing team. Bayesian modeling is relevant because it calibrates probabilities in a useful way.

In the example given above, two users with differently colored shirts are assumed likely to be different. This is a good heuristic because people's shirt color does not normally change—and if a user changes shirt, no great harm is done by losing user continuity. But what about other features that change more easily? An example is a user's position in the room—derived from audio, visual or other sensor data. If the position of the reference user is initially known, and a request comes from a user at a new position, can the agent make a confident decision about user continuity? The answer is no: the reference user could have moved to the new position, or another user could be there. Tracking the reference user usually overcomes this problem.

Tracking

Tracking users—and at least tracking the reference user—can be an essential part of establishing user continuity. Tracking is an ongoing activity, implemented during one or more duty cycles, short enough to simulate continuity through time. Tracking entire objects depends on tracking simpler features. The agent uses sensory inputs and applies DSP techniques to extract low-level features. Increasingly high-level features may also be computed. Tracking is based on making successive observations through time, of perceptually relevant features. A collection of one or more instantaneous feature observations may be called a "snapshot" characterization. An agent can build a snapshot" characterization by computing and assembling a set of features. Any number of sensors may be used for this purpose. In a multi-modal feature hierarchy, low-level features as well as high-level features can be involved in tracking. For example, combining a distance estimate (from a given view point in space) and an azimuth estimate (the direction of the same object observed from the same view point) yields a position estimate, which is a higher-level feature. It is possible to track distance, azimuth and position feature estimates, separately. In some embodiments, scene analysis features may be observed directly by the agent, or they may be inferred from lower level features and observations, such as inferring position features from distance and azimuth features. Duty cycles used for tracking may vary according to modality (such as 200 ms for an azimuth measurement derived from on a microphone array, vs. is for an azimuth measurement based on a video camera); the tracking intervals (duty cycles) may be regular or not.

For example, an agent may periodically measure perceptual features such as azimuth or distance, using a camera; if the camera is moving, such as might happen with a moving robot, compensation may be made for camera motion. A 3D camera, or a sonar, can be used to measure distance. Distance and azimuth together determine a position in space. Object tracking may be based on distance, azimuth, or position. Tracking is typically used to follow the reference user. The collection of instantaneous observations about a user is part of a snapshot characterization of the user. The characterization can also include a voice characterization, or voiceprint. A tracking module (or another part of the scene analysis subsystem) can also report if an object or user is no longer visible.

When sufficient sensory data and computational resources are available, tracking is quite powerful, because it allows an agent to follow a reference user's identity over time (use of the word "identity" does not imply that a user is identified in a database of users, only that a possibly unidentified user was tracked with confidence so that the agent believes that the new user is the same as the reference user.

Some devices have sufficient local computational resources to perform tracking. Other devices depend on remote servers to carry out some of the computations involved. The network bandwidth and latency requirements of tracking make the use of local processing advantageous, but many implementation architectures are possible.

In some embodiments of tracking, successive values of a feature give evidence for or against user continuity. A measure of continuity of every feature's value contributes positively to a user continuity decision. In some embodiments, contributions are binary. If a measure of feature space distance between one feature value and the next feature value is "low" (below a threshold), binary evidence exists in favor of continuity. In other embodiments, the successive values of a feature determine probability or likelihood scores that express a degree of support for user continuity based on the feature. Likelihood information can be combined from several features in order to make continuity. At the end of the day, a binary decision must be made, based on all available features, regarding user continuity. It takes into account binary support, comparison of one or more likelihood scores to a threshold, and weighting schemes.

An important consideration for tracking (as well as all perceptual event detection) is the possibility of errors. Every signal-processing technique has limitations, and both false positives and false negatives are likely to happen some of the time. Thresholds and weights are chosen to minimize false positives or false negatives, depending on the consequences of the error. When multiple features are available, subsets of features may be used in combination to make continuity decisions. For example, if a microphone array supports the estimation of a user's azimuth from audio data, a large change in azimuth between successive values speaks against continuity. On the other hand, if a camera is available, and the user is seen moving continuously from the reference user's visual azimuth to approximately the new user's visual azimuth, the combination of sound and image features will favor a positive user continuity decision.

In some embodiments, integrating features towards making decisions is done based on hand-coded rules. In other embodiments, a Bayesian sensor fusion framework is used. Feature calculations produce associated measures of variance, likelihood, or probability, supporting the principled integration of features.

Distance metrics may sometimes be used as a simplified alternative to a Bayesian approach. All feature dimensions contribute distances between observation points. For the continuous tracking of a feature, it is not the feature distance between a starting and an ending feature value that matters, but step-by-step distances measured at successive observation times; tracking succeeds when step-by-step distances are small, regardless of the end-to-end distance between start and finish.

Reserved Engagement

In a variant embodiment of a locking engagement, the locking condition is built-in, that is, permanently specified rather than determined by each explicit Lock request. In the absence of a Lock request, a first arbitrary request can transition to a locked state. This situation is distinct from conditional locking and described as a separate policy. The reserved state policy is a special-purpose optimized implementation of an implicit "Listen to me" conditional locking. It deserves its own treatment, as the locking and unlocking requests are also not needed.

The reservation policy could be expressed by the explicit spoken request "Listen to me for the next T seconds" but the differences are: (1) the request is implicit and can be omitted, it takes effect automatically without any effort from the user; (2) every time the user issues a request, a new T-second timer is started. If the timeout hits, the agent turns dormant, and a wakeword will be needed. Accessorily, there should be an option to change time T as a system parameter; such as "Reserve me for 10".

Figure 12:
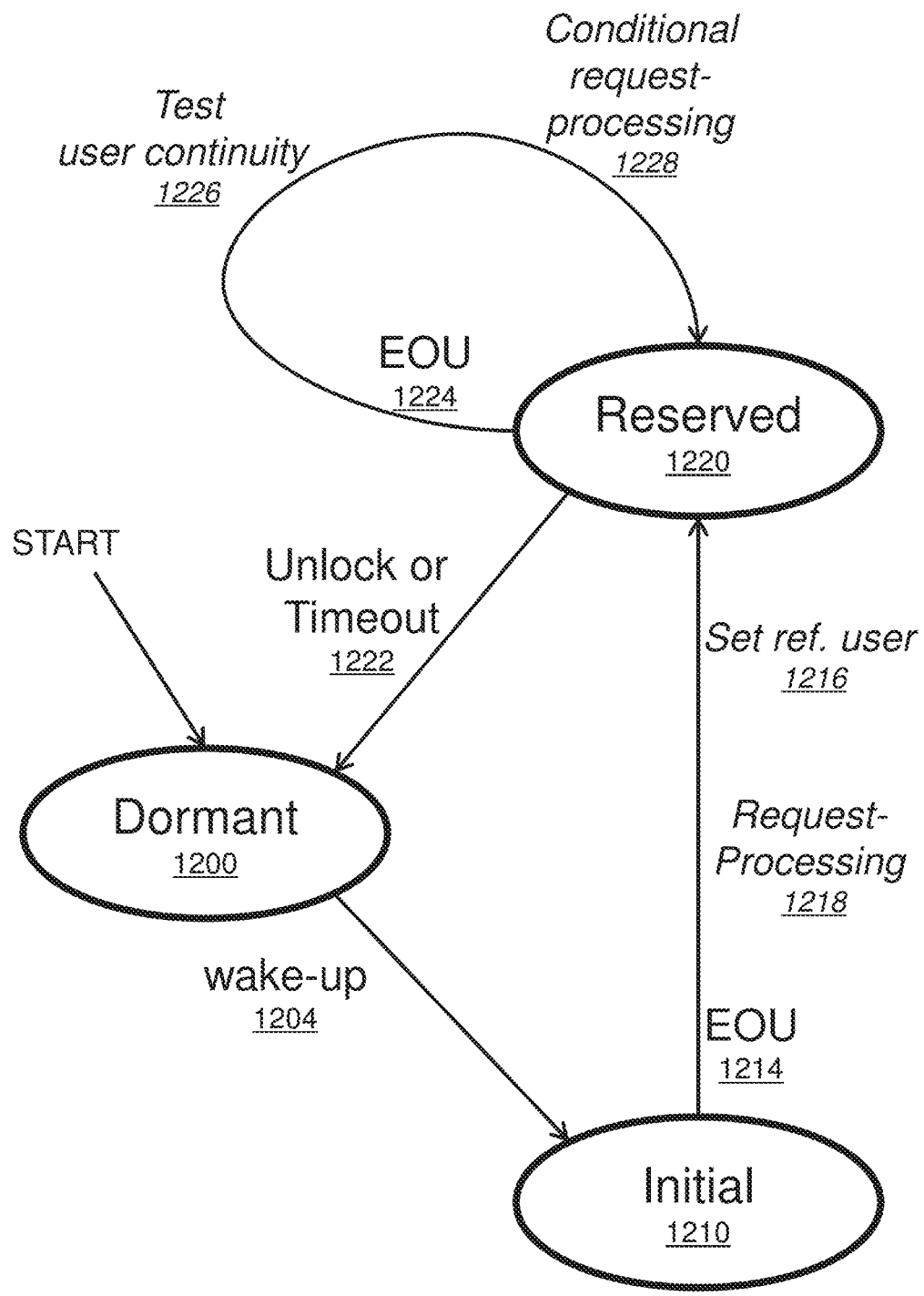
FIG. 12 shows an FSA with a reserved state, according to an embodiment.

FIG. 12 shows an FSA for reserved engagement, according to an embodiment. An agent starts in dormant state 1200; a wake-up indicator 1204 transitions the agent to initial state 1210, which is engaged and non-recurrent. A request received in initial state 1210 is called an initial request. It can be any valid request. The user who utters the initial request becomes known as the reference user. EOU 1214 triggers request-processing 1218. Setting the reference user 1216 is accompanied by additional processing to create a parametric model of the reference user. This is done so that the parametric model of the reference user will be available when needed in reserved state 1220. In reserved state 1220, an EOU 1224 causes the agent to test user continuity 1226. The test is based, as discussed earlier, on a comparison of the parametric model of the reference user with a parametric model of the new user. In conditional request processing 1228, the request is processed when the user continuity test succeeds; if the test fails, the request is ignored. In reserved state 1220, conditional request processing 1228 is performed repeatedly until the agent detects an Unlock command or a timeout (1222).

Figure 13:
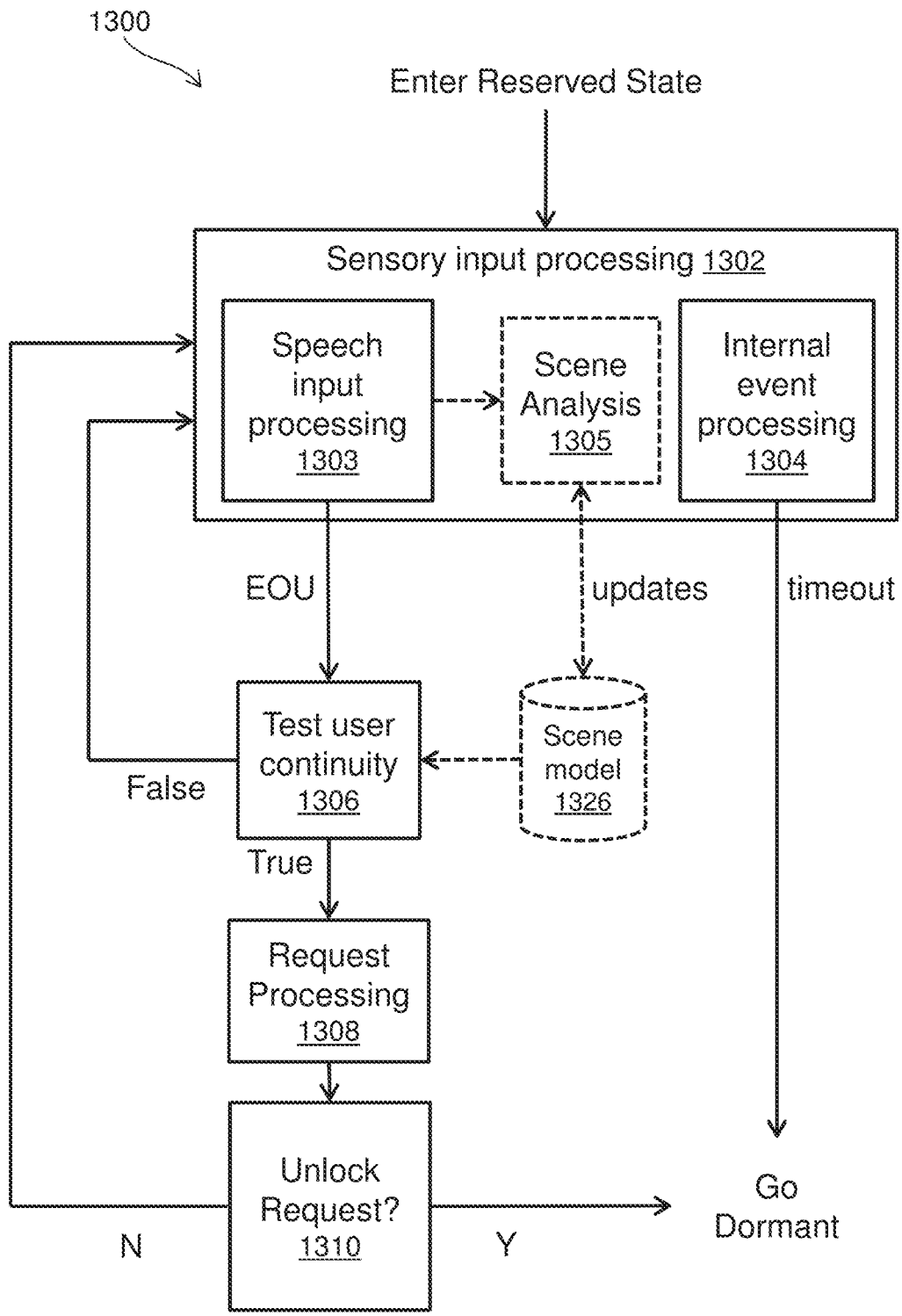
FIG. 13 shows the logic in a reserved state, according to an embodiment.

FIG. 13 shows the logic 1300 for a reserved state, according to an embodiment.

Entering a reserved state triggers sensory input processing 1302, which may simultaneously perform multiple tasks, including speech input processing 1303, internal event processing 1304, and optional scene analysis 1305. Speech input processing 1303 detects the beginning and end of a new utterance and signals an EOU, which in turn triggers a test of user continuity 1306. If the test succeeds, the request is processed 1308. If an Unlock request is recognized 1310, the agent transitions to the dormant state. For other requests (e.g., the Unlock request is not recognized in 1310), the agent returns to the reserved state and resumes sensory input processing 1302.

Internal event processing 1304 can detect a timeout, which also causes a transition to the dormant state. The parallel execution of several subtasks of sensory input processing 1302 can be achieved in many ways. In some embodiments, sensory input processing 1302 uses a duty cycle suitable for speech, e.g., 10 ms-100 ms. In some embodiments, detection of timeouts by internal event processing 1304 uses a duty cycle of, say, 1 second. Alternatively, timeouts can be detected by a hardware timer's interrupt.

In some embodiments, sensory input processing 1302 includes an optional scene analysis 1305, which updates the scene analysis description of the reference user (scene model 1326) which is adapted as additional data is collected, improving the accuracy of user continuity tests. In some embodiments, speech input processing 1303 provides more data to model the reference user's voiceprint. Hence, a model of the reference user's voice can be adapted when more speech samples are available, improving the reliability of voiceprint matches. In the embodiment shown, data from speech input processing 1303 is handed over to optional scene analysis 1305, which informs and updates scene model 1326. (The dotted arrows are not state transitions but data flow connections.)

Examples of such scene analysis descriptions include, e.g., the reference user's position (that could be based on the azimuth and the distance from one or more observation points) and other parameters amenable to tracking. Tracking of the reference user clearly contributes to the user continuity decision, but tracking of other users does as well, since two users known to be distinguished at one point in time (as "reference" vs "other") will retain this distinction through tracking, if it cannot be established otherwise at the time of the test. The availability of sophisticated scene analysis methods is assumed in this disclosure. However, the exact nature and details of scene analysis do not affect the inventive concept.

As part of the test of user continuity 1306 (or alternatively as part of speech input processing 1303) the agent builds a parametric model of the new user (the one that uttered the new request) based on the new user's speech, and possibly other sensory data. The section on user continuity discusses the variety of methods available to carry out the test of user continuity 1306. The agent compares the two parametric models (that of the reference user and that of the new user) and can make a decision about user continuity. Due to the possibility of tracking, though, there is more to testing user continuity than just comparing two models. If the user continuity test fails, the agent returns to sensory input processing 1302 without processing the command.

In some embodiments of the agent reservation policy shown in FIG. 12, a timeout occurs when a specified amount of idle time (such as, say, 10 seconds) has elapsed between two requests from the reference user. In particular, every request received from the reference user resets the timeout timer, so that the user retains exclusive control of the agent during the next (say) 10 seconds. If the reference user does not issue a request for (say) 10 seconds, the agent returns to dormant state 1200. It will take a wake-up indicator to transition the agent to initial state 1210. The identity of the reference user is forgotten when the agent is dormant, and a change of reference user is able to take place after a wake-up. When an initial request received in initial state 1210, a new reference user is chosen.

In some embodiments, a timeout occurs when a specified amount of idle time has elapsed between requests, including those from users other than the reference user. This gives the reference user more time after interferences. In some embodiments, a timeout occurs when a specified amount of total locked time has elapsed since first entering the locked state.

In some embodiments, initial requests that cannot be processed successfully do not change the reference user, and the agent remains in initial state 1210. In other embodiments, a failing initial request still changes the reference user, and the agent proceeds to reserved state 1220.

Releasing the Agent's Attention

Out of courtesy, a user who no longer needs the agent's attention should release the agent for someone else to use, instead of waiting for the timeout to hit and allow the other user to take control. A simple Unlock request, such as "Thanks" or "Done" will do this. This shows politeness to the agent as well as to other users. An additional beneficial effect is to avoid King Midas issues.

Stealing the Agent's Attention

In some embodiments, the locking policy of FIG. 9C is applied in a literal way, and an utterance from a new user is entirely ignored if the new user does not match the reference user. In some embodiments, locking only remains active for a limited period of time. After a timeout, the agent's engagement state may be lowered, either fully, to a dormant state (see Unlock 922 in FIG. 9C or Unlock1 962 in FIG. 9D) or partly, to an engaged state such as one-time state 950 (Unlock2 966 in FIG. 9D) or attentive state 1660 (Unlock2 in FIG. 16B.) Recall that in these situations, timeouts are treated as a special kind of Unlock indicator.

In other embodiments, the restriction of an agent's attention to the reference user, to the exclusion of other users, is not literal, and the agent's attention can be taken away from the reference user under certain conditions. In some embodiments, users with high authority are granted a higher rank, which gives them the ability to steal the agent's attention and override the lock put in place by a reference user of lower rank. In some embodiments, rank determination is based on user identity. In some embodiments, a rank determination is a spatially determined attribute. The ranking of users could depend, for example, on their proximity to a hot zone. A user found significantly closer to a hot zone than the reference user could override the lock, and steal the agent's attention. In another example, a user gazing at the right hot spot could steal the agent's attention. In some embodiments, speaking much louder than the reference user could steal the agent's attention.

Spatial Control

According to an embodiment, entering a specified region of space may act as a Lock indicator, and exiting a specified region of space may act as an Unlock indicator. In a preferred design, if entering a region of space locks the state, exiting the same region of space should unlock it. This interaction design will minimize the user's cognitive load, as it is easy to visualize the presence of a locked area. In such an embodiment, various sensors such as sonars, lasers, or 3D sensors may define a region of space, in lieu or in addition to cameras. There may also be electromagnetic sensing of active or passive devices that the user carries.

Other forms of spatial locking control (or other transitions) exist, such as: sitting on a chair or gazing at a particular hot spot in a room. There can be many distinct hot spots in a home, or in an automobile. Engagement can be controlled by the direction of the user's gaze, and more usefully, by a combination of aiming one's gaze at a hot spot and starting to speak at the same time. This can, for example, act as a wake-up indicator when interacting with a robot, or any device with hot spots. When there are multiple hot spots, the choice by the user's gaze of a specific hot spot can control the selection of a domain, or an agent state, or an agent property.

Using a robot's eyes as a hot spot, a user can make eye contact. Eye contact alone is perhaps insufficient evidence that the user wants to address the agent. But if the user turns towards the agent, or looks at a hot spot (gaze direction) then starts speaking, this is a natural way for a user to engage with an agent. This mimics a common way to engage with a person: while establishing eye contact, start speaking to the person. According to an embodiment, an agent can use a wake-up indicator based on the user starting to speak within a defined time window of establishing eye contact. For example, the occurrence of speech after detecting uninterrupted eye contact with a robot for, say, less than five seconds, could act as a Wake-up indicator. The uttered speech would not require a Wake-up indicator. Conversely, if detecting eye contact was instrumental in engaging an agent, detecting that the gaze has shifted away could disengage.

For 'safety' with respect to the King Midas issue, Lock requests should make false positives rare. For a good user experience, they should be natural, simple to learn, and not look awkward. For an Unlock indicator, false positives are less of an issue. Dropping out of lock only bears a small risk, as long as the user is aware of the need to reawaken or re-lock the agent before another request, which is a matter of state transparency. For example, a mere glance at a "cold" region of space (away from hot spots) could serve as an Unlock indicator.

State Transparency

To benefit from the possibility of skipping a wake-up indicator, a user must know whether the wake-up indicator is needed, i.e., whether the agent is dormant or not. In some cases, a user knows an agent's state even if it is not displayed. This happens, for example, with explicit lock/unlock requests, in the absence of timeouts. A need for state transparency occurs when the user is uncertain about the agent's state. This can happen, for example, when a timeout could hit and cause a state change without any user action or when a user enters or exits a hot zone, inadvertently crossing a boundary. Whenever the user can be unaware of a change in agent state, it is important (to take full advantage of the methods disclosed herein) to expose the agent to the user, or alternatively, to alert the user of state transitions.

Some embodiments follow an interaction design practice that reveals to users the current state of the agent, using any suitable user interface means. When users can see the agent's state, they can behave accordingly. Users will use a wake-up phrase only when the agent is seen to be dormant. Without offering such feedback to the user, the agent does not provide the naturalness of avoiding the wake-up phrase.

In current virtual assistants, a graphic animation is often used to convey whether an agent is "listening", which is to say, engaged. Generally, an agent should give a user some sort of feedback indicating the state the agent is in. For example, the Nao robot from FIG. 5 allows the software to change the color of its eyes. The agent can cause Nao to display, for example, dull grey eyes when dormant, orange eyes when locked, and green eyes when engaged but not locked.

Feedback indicators should be simple and safe. Displaying a colored light or an icon is often a good choice, but it is not safe in a car, as the driver must not be visually distracted. Using clearly identifiable sounds can be an effective alternative for a car. For example, entering a dormant state or a locked state can be communicated by a short sound uniquely associated with the state entered. In some embodiments, both visual and auditory cues are used to convey the current state, and users can rely on either of them to know what to do next.

Attentive Agent Engagement

The attentive agent policy seeks to minimize wakeword fatigue and increase the efficiency and naturalness of man-machine dialog without explicit user intervention. An agent does this, based on its ability to mimic human dialog behavior, to perceive engagement cues, and to control its own engagement accordingly. People often convey their intention to remain engaged using body language, eye contact, and other clues. An attentive agent notices such clues, based on perceptual observation of users and a model of how to interpret the cues as a wish to engage, to remain engaged, or to disengage. In contrast with a locked or reserved agent, an attentive agent makes dynamic engagement and disengagement decisions autonomously.

After an initial wake-up indicator, an attentive agent remains engaged by default, that is, as long as it does not detect conditions that suggest the user wants to disengage. This choice of default aims at protecting the user from wakeword fatigue. To achieve its goal, an attentive agent uses any of its capabilities, including all available sensory and perceptual abilities, to predict whether the user wishes to remain engaged or to disengage. The agent matches the user's presumed intention by remaining engaged or disengaging accordingly.

The attentive agent policy differs from the locked agent policy, in that it does not rely on locking and unlocking requests. The attentive agent policy differs from the reserved agent policy in that the agent can disengage at any time, automatically, based on its perceptions. A hybrid policy that incorporates aspects of both the attentive agent policy and the locked agent policy will be discussed later.

Looking a bit closer, probabilities and thresholds are always involved in an agent's decision-making. An attentive agent decides to remain engaged when there is a high likelihood (based on its perceptual observations) that the user wishes to remain engaged and issue another request as part of an ongoing dialog. If the agent notices evidence to the contrary, that is, if some factor lowers the likelihood that the user wishes to remain engaged below a threshold, the agent will disengage and return to a dormant state, requiring a wake-up indicator to re-engage. The agent can choose to disengage at any time, be that when the user speaks, or while the agent is tracking the user's behavior to detect disengagement clues before a request is issued.

Factors that affect the likelihood that the user wishes to remain engaged vary in importance and definiteness. Some factors are binary, while others are subtle and can be mitigated by circumstances. The factors include, among others: breaking eye contact with a robot or hot spot; turning one's head or body away; allowing too much time since the last request (this can use an idle time timeout, and optionally a diminishing likelihood as time passes); addressing, by name, another person in the room; changing topic abruptly; or saying something the agent doesn't understand. (If a request is incorrectly formulated, the user needs a chance to rephrase it and stay engaged, but this needs to be done promptly. A very short idle time timeout can be set up, during which the agent remains engaged to allow another try.)

Figure 14:
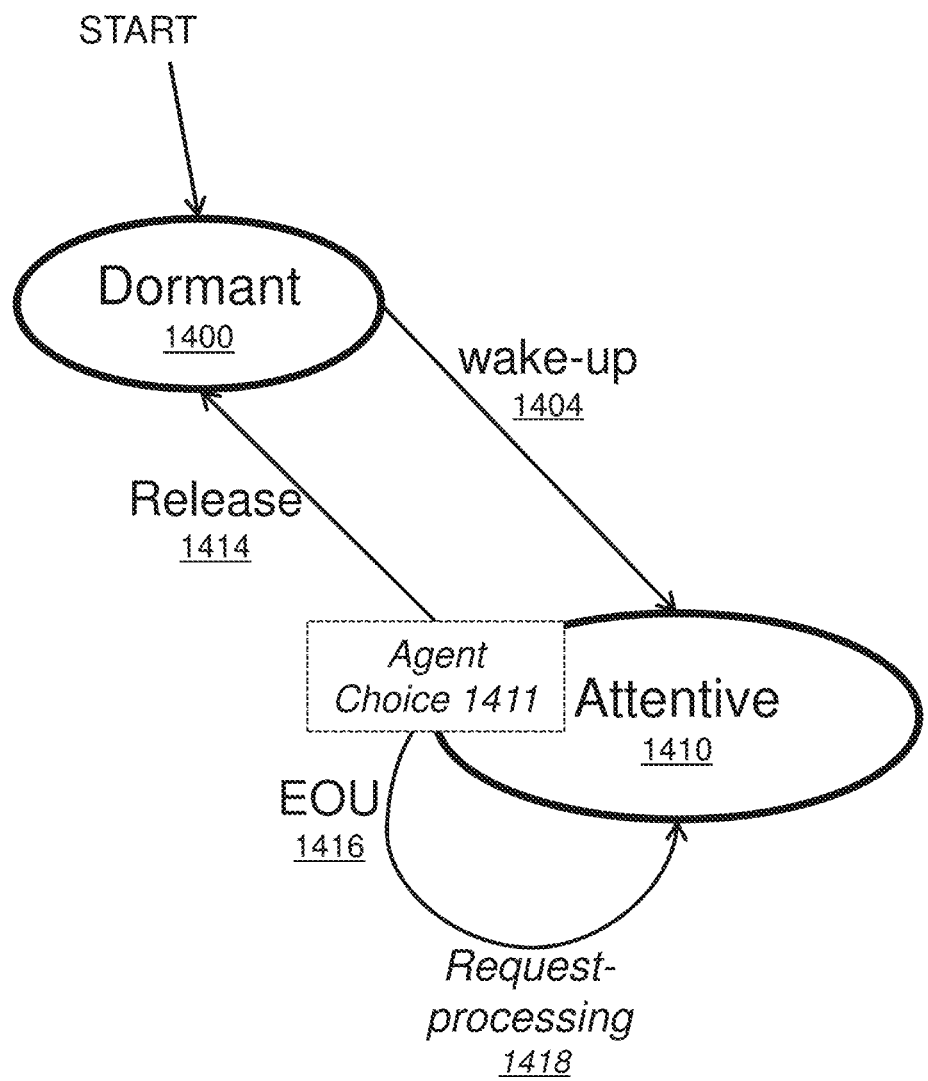
FIG. 14 shows an FSA with an attentive state, according to an embodiment.

FIG. 14 shows an embodiment of an attentive agent engagement policy. After a user wakes up the agent from dormant state 1400, using any wake-up indicator 1404, the agent transitions to attentive state 1410. In some embodiments, the agent has perceptual capabilities and can observe the behavior of the user to decide whether to transition to the dormant state or remain in the attentive state. This choice 1411 by the agent can be made before a user request is received, or upon reception of the request.

While in attentive state 1410, the agent may make a choice 1411 to release 1414 its engagement, and transition to dormant state 1400. If a user utters a request while the agent is in attentive state 1410, receiving EOU 1416 also triggers (agent) choice 1411, for a final choice between continued engagement and release to dormant state 1400. In the absence of such release, request-processing 1418 occurs, and the agent remains in attentive state 1410.

In some embodiments, the agent has sensors sufficient to support the tracking of a reference user, and it tests user continuity on an ongoing basis. In some such embodiment, if the agent fails to track the user continuously, it can choose 1411 to immediately release 1414 its engagement. Alternatively, relatively short periods of non-tracking (or of low-confidence tracking) could be tolerated without the agent choosing to release 1414. In yet another embodiment of the continuity test, a failure of continuous tracking only affects a tracking score, but the agent's choice 1411 to release or not is only made when a new request is received.

When a request is received in the attentive state 1410, and the tracking score is low (the agent was not able to track the reference user continuously and confidently) or non-existent (the agent did not have sufficient means of tracking users) the agent may attempt to match the new user's voice with the reference user's voice, and choose 1411 to release 1414 its engagement, ignoring the request.

In an attentive agent, semantics can also have an effect on engagement decisions, and override other factors. One such case is the use of a follow-up request. For example, if a user asks, "What is the weather in New York?" and after getting an answer, asks a follow-up question, "How about Chicago?" it is plausible that the second request (understood as "What is the weather in Chicago?") should be grouped with the first one, and not require a wakeword, even if other factors suggest disengagement. This requires a "peek previous" of the second request.

Some embodiments use request semantics in a broader way to assist in a user continuity decision. Information requests are less "risky" than requests for action, which have side effects. If someone asks, "what is two plus two" or "what is the capital of Japan," there is no reason for the agent to require a wake-up indicator, or to check that the user is the reference user. But an action request such as "Call Mom" should make sure that the requesting user is the same as the reference user. An agent can distinguish information requests from action requests, assume that information requests are safe, and not require a wake-up indicator even if the voice of the new user does not match that of the reference user. Safety generally has to do with the avoidance of unwanted side effects. Action requests are typically considered unsafe for that reason. But an action request can be safe ("turn off the fan") and an information request can be unsafe if it reveals private information to an unintended party ("what is my social security number?"). In a variant embodiment, a safe/unsafe distinction is made as a result of processing a request. Natural language processing (typically done using a semantic parser) can return a safety indicator, which, if true, allows a response to be computed and given to the user without the need for a wake-up indicator. This also requires a "peek previous" of the second request.

Figure 15:
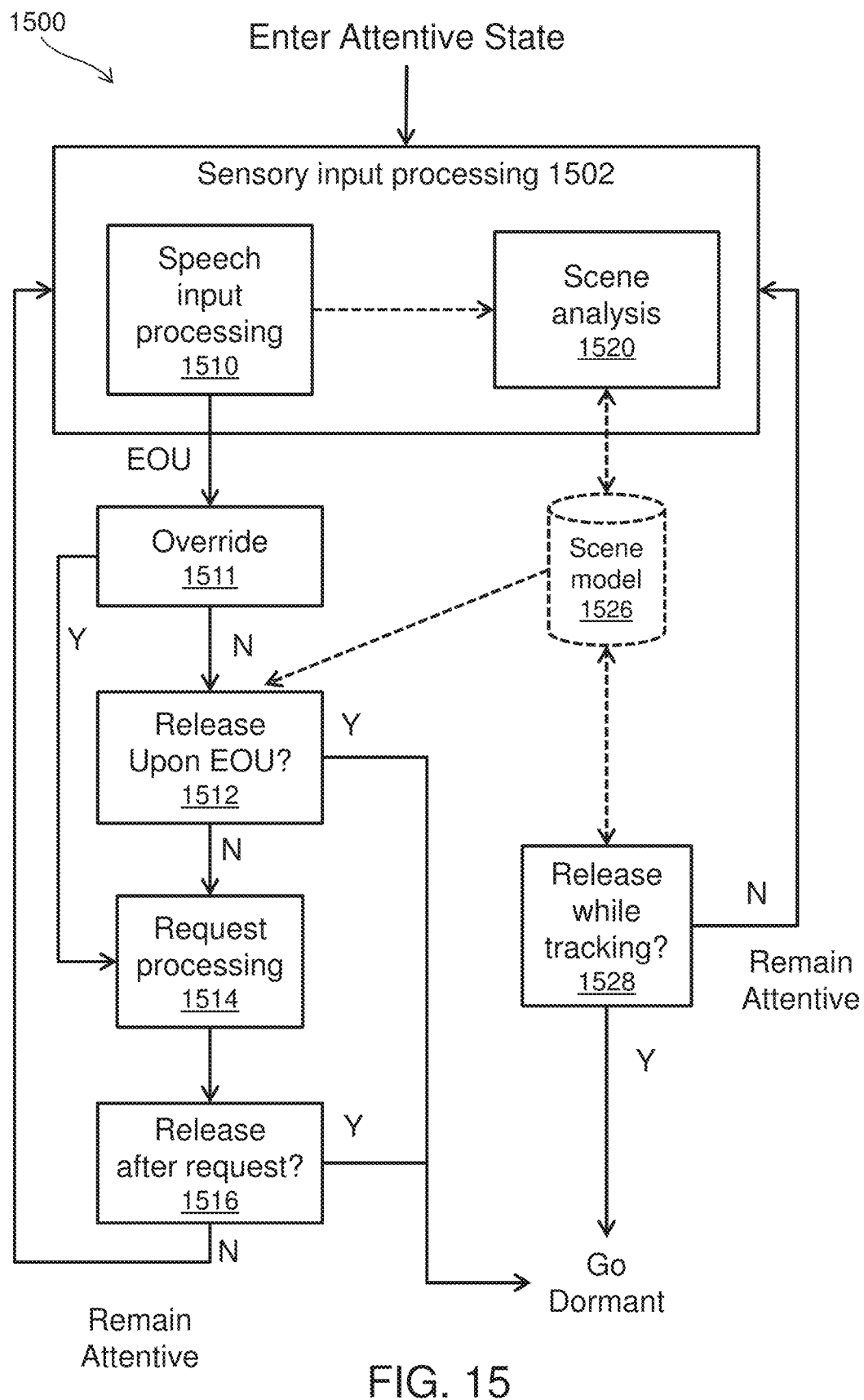
FIG. 15 shows the logic in an attentive state, according to an embodiment.

FIG. 15 shows the logic 1500 in an attentive state, according to one embodiment. Sensory input processing 1502 runs one or more tasks in simulated parallelism, as discussed before for similar sensory input processing steps (1002 for dormant state, 1104 for locked state, 1302 for reserved state.) The input processing tasks include speech input processing 1510 and optionally scene analysis 1520. Speech input processing 1510 detects the beginning and end of each new utterance and triggers an EOU. The first type of release decision, "Release upon EOU" 1512, was discussed in conjunction with agent choice 1411 in FIG. 14. In fact, the "agent choice 1411" step of FIG. 14 is broken up in FIG. 15 into three separate decision steps corresponding to three different situations: "release upon EOU" 1512, "release after request" 1516 and "release while tracking" 1528. All of these release possibilities were introduced in conjunction with FIG. 14 as instances of agent choice 1411. Every decision to release takes the agent to dormant state 1400.

In some embodiments, semantic considerations (just discussed above) support the override step 1511 of other considerations that would cause disengagement and allow request-processing 1514 to proceed without the full release upon EOU 1512. This can involve safety examination of unwanted side effects of confusing the new user with the reference user. In the absence of an override (Y branch of step 1511), the request-processing 1514 is processed only if there is no release upon EOU 1512. Explicit requests to release can cause a release after request 1516. In the absence of such a release, the agent remains attentive, and control returns to the top of the attentive state loop.

Scene analysis 1520 produces a scene model 1526 that can be used by the "release upon EOU" step 1512 and "release while tracking" step 1528. Scene analysis can be extremely complex. This disclosure makes no attempt to describe scene analysis in all its complexity. But two aspects are worthy of note. First, certain perceptual features (such as the physical position of the reference user, gaze direction, body direction, face direction) and perceptual events including gestures (turning one's body away, breaking eye contact) have an effect on engagement and disengagement decisions. Second, tracking the reference user is also an important component of engagement and disengagement decisions, and it is part of live scene analysis. Some release decisions are made based on tracking in "release while tracking" step 1528, causing the agent to go to the dormant state or to remain in the attentive state. "Release while tracking" step 1528 uses a scene model 1526 that is created and updated by scene analysis 1520.

Hybrid Engagement Control

Hybrid engagement policies may be obtained by combining techniques previously disclosed in a rather straightforward manner.

Figure 16A:
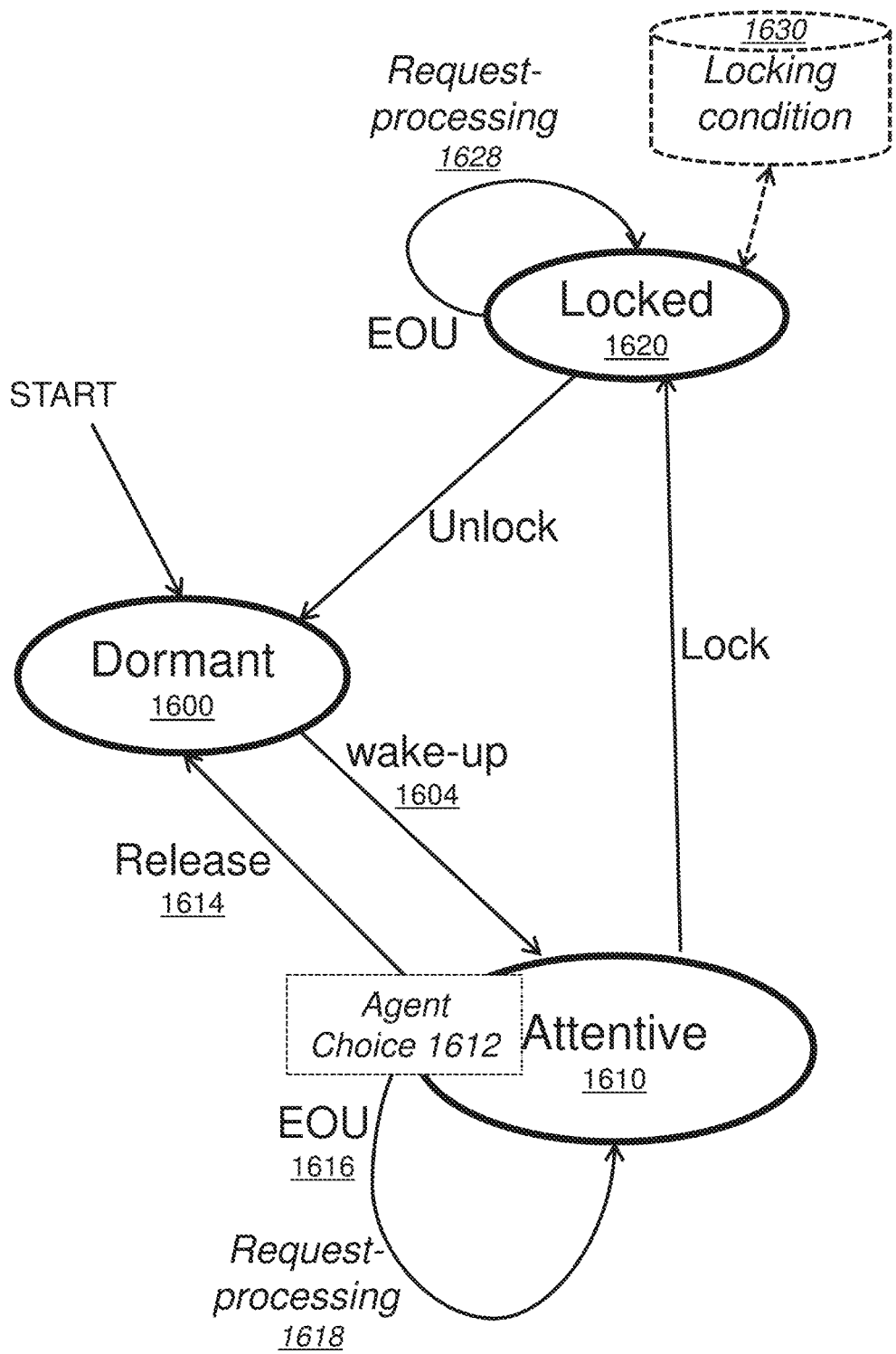
FIG. 16A shows a hybrid FSA with an attentive state and a locked state, according to an embodiment.

FIG. 16A illustrates a hybrid system of engagement control in which a user-directed method (locked agent policy) and an agent-directed method (attentive agent policy) are both used simultaneously. The FSA of FIG. 16A is created in a straightforward manner in two simple steps: (a) making an exact copy of the locked FSA of FIG. 9C, with all item references renumbered; and (b) replacing the copy of the one-time state 910 (from FIG. 9C) with a renumbered copy of attentive state 1410 from FIG. 14. This is attentive state. The latter step includes copying the self-loop from attentive state 1410 to itself.

An alternative way of looking at the creation of the FSA in FIG. 16A is to start with a copy of the attentive agent FSA of FIG. 14, and add copies of locked state 920 from FIG. 9C, together with all its transitions. Either way, these operations create a "merged" (or "grafted") FSA based on FIG. 9C and FIG. 14.

The functionality of the merged FSA (FIG. 16A) derives from the functionalities of contributing FSAs. Because each state has its own independent logic, which is not affected by copying (as long as renumbering is used consistently) it follows that:

the logic of dormant state 1600 is dormant state logic (see FIG. 10);

the logic of attentive state 1610 is attentive state logic (see FIG. 14); and the logic of locked state 1620 is locked state logic (see FIG. 11).

Based on using this merged logic, the behavior of the hybrid FSA of FIG. 16A will be a plain combination of previously described behaviors. For example, FIG. 16A illustrates Agent choice 1612 (which is similar to agent choice 1411 of FIG. 14), release 1614 (which is similar to release 1416 of FIG. 14), EOU 1616 (which is similar to EOU 1416 of FIG. 14), request processing 1618 (which is similar to request-processing 1418 of FIG. 14), request processing 1628 (which is similar to request-processing 968 of FIG. 9D) and locking condition 1630 (which is similar to locking condition 969 of FIG. 9D). A shorter description should suffice. Starting in dormant state 1600, in response to a wake-up indicator 1604, the agent enters the attentive state 1610. The behaviors involving the attentive state 1610 are previously described. If at some point, the user places a locking request, the agent enters locked state 1620. The behaviors involving locked state 1620 are previously described. The attentive state 1610 and the locked state 1620 are both recurrent, i.e. able to process requests repeatedly without a wake-up. This said, it is easier to fall out of engagement in the attentive state. Furthermore, after locking, the hybrid FSA of FIG. 16A requires a return to the dormant state before re-engaging. This last aspect is different with the hybrid FSA of FIG. 16B—a variation of FIG. 16A that has additional transitions.

Figure 16B:
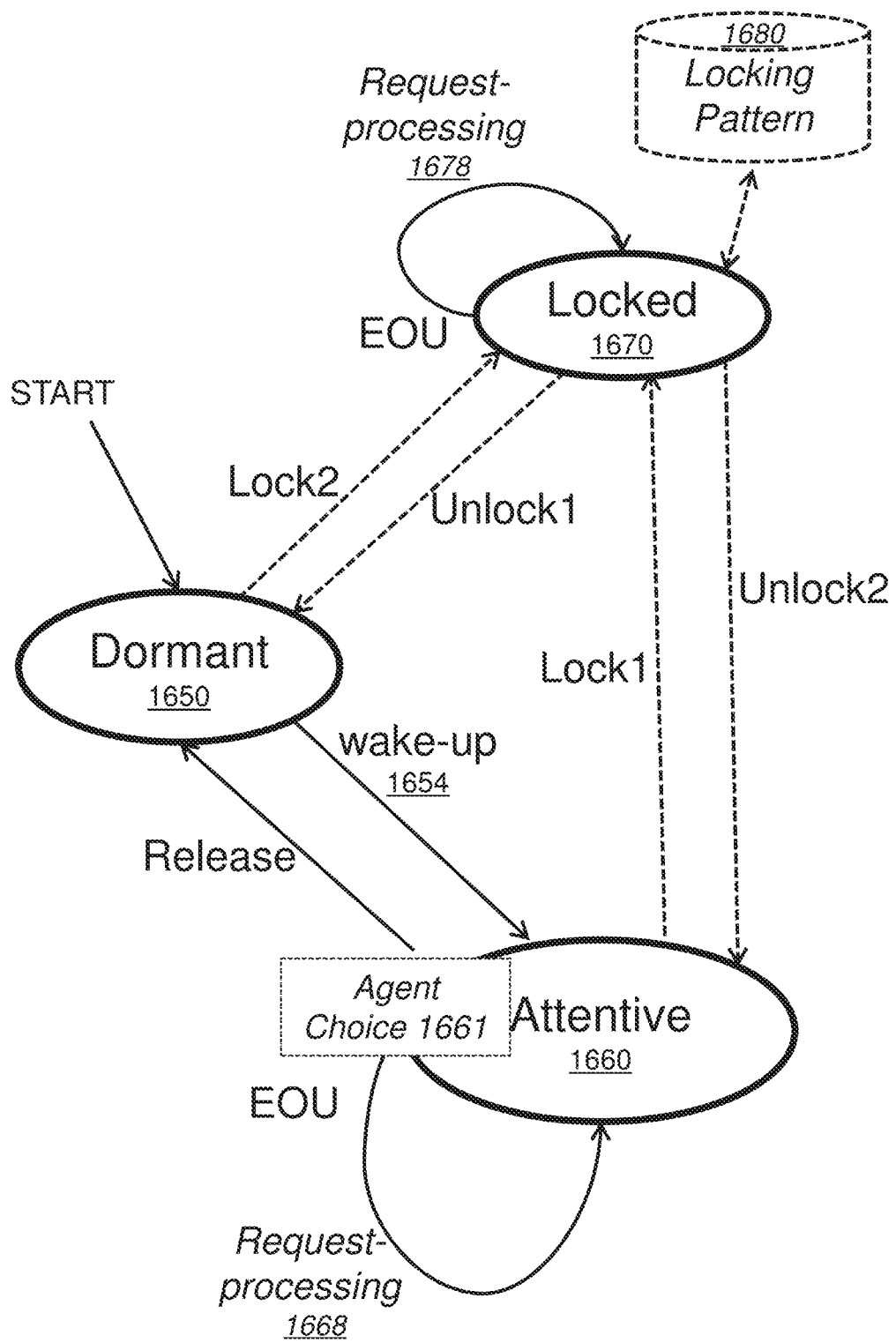
FIG. 16B shows a variation of the FSA of FIG. 16A, according to an embodiment.

The construction of FIG. 16B may be done three ways, which are equivalent: (1) use FIG. 9D instead of FIG. 9C to merge FSAs with FIG. 14; (2) start with a copy of the FSA of FIG. 14, and add copies of locked state 960 from FIG. 9D, together with all its transitions; or simply take the already merged FIG. 16A and add a Lock2 transition and an Unlock2 transition—the un-numbered versions of Lock2 (transition) 948 and Unlock2 (transition) 966 from FIG. 9D.

Two things have changed: (1) it is possible to go directly from dormant state 1650 to locked state 1670. Although Lock2 cannot be a request, it can be a wakeword or other "locking wake-up" indicator. The use of one-step locking may come in handy in some contexts; (2) it is possible to unlock the state and remain engaged. Unlock2 indicator(s) can be anything including requests.

Handover

One further variation is that a spoken request issued from a reserved state, or from a locked state, can enable the locking condition of user continuity but accept a new reference user, all without going through the dormant state. In a first variant, a simple "Handover" request will accept as reference user the first user who speaks, but only within the next T1 seconds. In the reserved agent FSA, except for the timeout, this is as if a transition were made from reserved state 1220 to initial state 1210, after a wake-up. The first request received is processed 1218, a new reference user is characterized and set 1216, and the agent is reserved for the updated reference user.

In a second variant, "Handover to <enabling-condition>", the new reference user is whoever meets the enabling condition and speaks first, before the T1 timeout. Possible enabling conditions include: (1) being a specific person ("Handover to John") or specific persons ("Handover to the guests", "Handover to the children"); (2) being in a specific place, or given hot region ("Handover to the back seat"). The hot spot must be known by default or specified in the Handover request. Other enabling conditions could involve gender, visual properties, and so on ("Handover to the raised hand", "Handover to the guy with the red shirt across the table"), or whatever description the agent is able to interpret and use.

Once handed over, a person of higher ranking can grab back the agent's attention—see the "Stealing the Agent's Attention" section. This would apply in a family context, for example, for something as mundane as controlling verbal access to the TV remote or choosing a song to play. Numerous workplace applications can be found for the ability to reserve the agent. It is like holding a virtual microphone.

Computer Embodiments

Figure 17A:
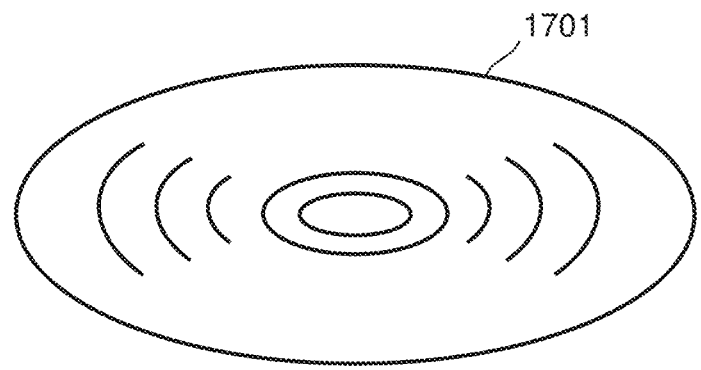
FIG. 17A illustrates a rotating disk non-transitory computer readable medium, according to an embodiment.

FIG. 17A shows a non-transitory computer readable rotating disk medium 1701 that stores computer code that, if executed by a computer processor, would cause the computer processor to perform methods or partial method steps described herein.

Figure 17B:
FIG. 17B illustrates a flash random access memory non-transitory computer readable media, according to an embodiment.

FIG. 17B shows a non-transitory computer readable Flash random access memory (RAM) chip medium 1702 that stores computer code that, if executed by a computer processor, would cause the computer processor to perform methods or partial method steps described herein.

Figure 17C:
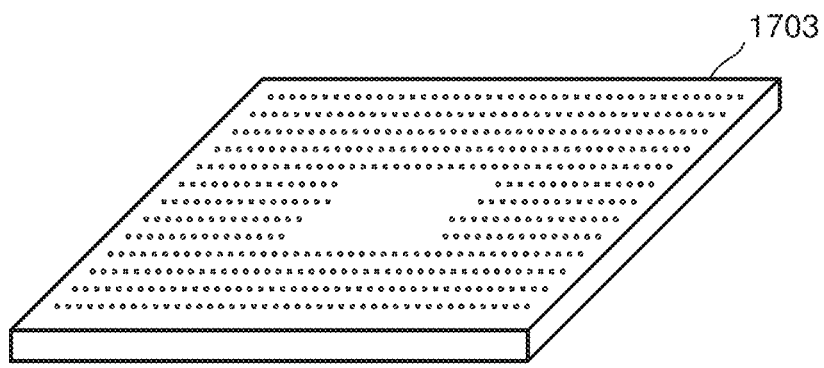
FIG. 17C illustrates the bottom side of a computer processor based system-on-chip, according to an embodiment.

FIG. 17C shows the bottom (solder ball) side of a packaged system-on-chip (SoC) 1703 comprising multiple computer processor cores that comprises a component of some embodiments and that, by executing computer code, perform methods or partial method steps described herein.

Figure 18:
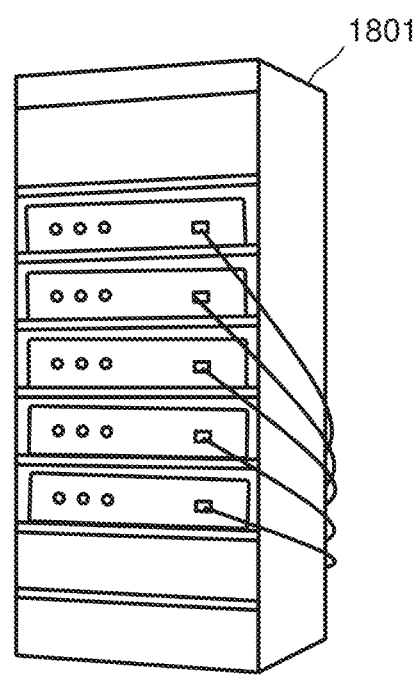
FIG. 18 illustrates a server, according to an embodiment.

FIG. 18 shows a rack-based server system 1801, used as a server component of various embodiments.

Figure 19:
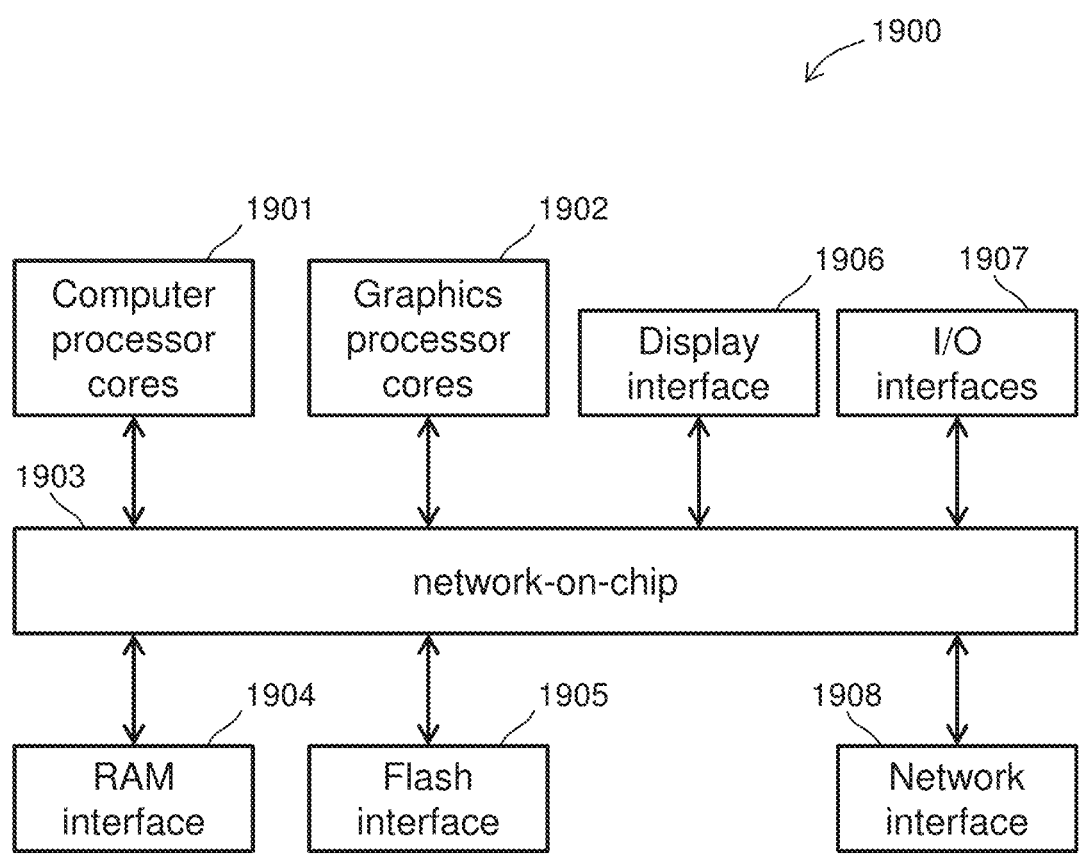
FIG. 19 illustrates a block diagram of a system-on-chip for devices, according to an embodiment.

FIG. 19 shows a block diagram 1900 of the cores within the system-on-chip 1703. It comprises a multi-core computer processor (CPU) 1901 and a multi-core graphics accelerator processor (GPU) 1902. The CPU 1901 and GPU 1902 are connected through a network-on-chip 1903 to a DRAM interface 1904 and a Flash RAM interface 1905. A display interface 1906 controls a display. An I/O interface 1907 provides for sensor and effector access for the human-machine interface of a device controlled by SoC 1703. A network interface 1908 provides access for the device to communicate with servers over the internet.

Figure 20:
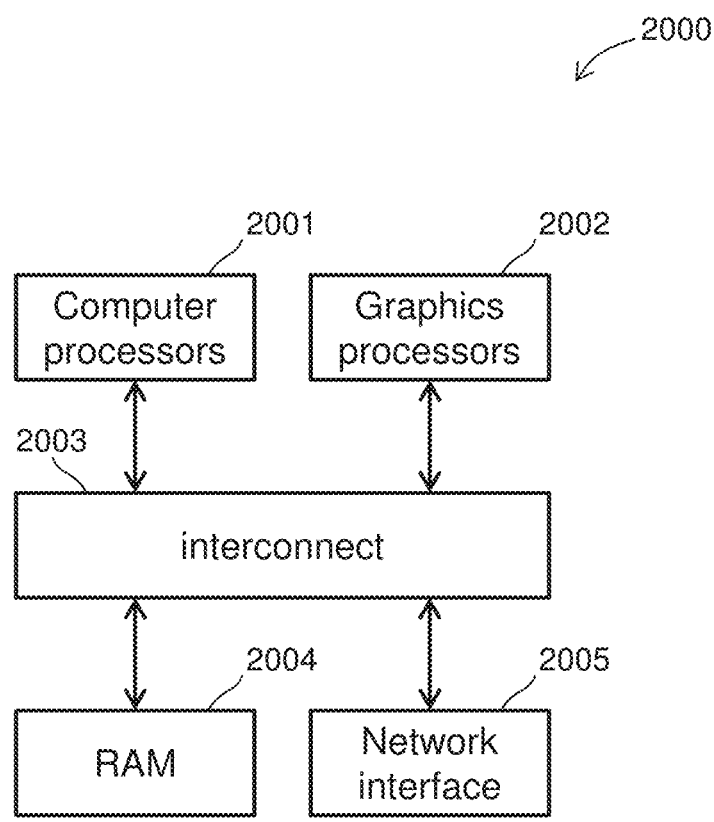
FIG. 20 illustrates a block diagram of a server processor, according to an embodiment.

FIG. 20 shows an embodiment of the server system 1801. Specifically, FIG. 20 illustrates a system 2000 including multiprocessor CPU array 2001 and a GPU array 2002 that connect through a board-level interconnect 2003 to a DRAM subsystem 2004 that stores computer code and a network interface 2005 that provides internet access to other servers or devices.

What is claimed is:

1. A method of controlling an engagement state of an agent during a human-machine dialog, the method comprising:
   receiving a spoken request that is a conditional locking request, wherein the conditional locking request uses a natural language expression including (1) a locking command and (2) a locking condition according to which the agent remains in a locked state;
   storing the locking condition in a format that can be evaluated when needed by the agent;
   entering a conditionally locked state in response to the conditional locking request;
   in the conditionally locked state, receiving a multiplicity of requests without a need for a wakeup indicator; and
   for a request from the multiplicity of requests:
      evaluating the locking condition upon receiving the request; and
      processing the request if the locking condition is true.

2. The method of claim 1, wherein the locking condition is time-based and the natural language expression includes at least one of the words "after," "before," "until," "when," and "while".

3. The method of claim 1, wherein the locking condition is location-based and the natural language expression includes at least one of the words "in," "outside," "near," "next to," "where," "wherever" and "within".

4. The method of claim 1, further comprising:
   receiving a spoken request that is an unlock request; and
   exiting the conditionally locked state in response to the unlock request.

5. The method of claim 1, further comprising:
   receiving a timeout; and
   exiting the conditionally locked state in response to the timeout.

6. The method of claim 1, wherein:
   the conditional locking request is spoken by a first user; and
   the method further includes ignoring a wakeword spoken by a second user, the first user and the second user being different users.

7. The method of claim 6, wherein the ignoring of the wakeword spoken by the second user is performed as a result of the first user having a higher ranking than the second user.

8. An automotive virtual assistant subsystem supporting human-machine dialog, the subsystem comprising software instructions for:
   receiving a spoken request that is a conditional locking request, wherein the conditional locking request uses a natural language expression including (1) a locking command and (2) a locking condition according to which the subsystem remains in a locked state;
   storing the locking condition in a format that can be evaluated when needed by the subsystem;
   entering a conditionally locked state in response to the conditional locking request;
   in the conditionally locked state, receiving a multiplicity of requests without a need for a wakeup indicator; and
   for a request from the multiplicity of requests:
      evaluating the locking condition upon receiving the request; and
      processing the request if the locking condition is true.

9. The automotive virtual assistant subsystem of claim 8, wherein the locking condition is time-based and the natural language expression includes at least one of the words "after," "before," "until," "when," and "while".

10. The automotive virtual assistant subsystem of claim 8, wherein the locking condition is location-based and the natural language expression includes at least one of the words "in," "outside," "near," "next to," "where," "wherever" and "within".

11. The automotive virtual assistant subsystem of claim 8, further comprising:
   receiving a spoken request that is an unlock request; and
   exiting the conditionally locked state in response to the unlock request.

12. The automotive virtual assistant subsystem of claim 8, further comprising:
   receiving a timeout; and
   exiting the conditionally locked state in response to the timeout.

13. A non-transitory computer-readable recording medium having computer instructions recorded thereon for controlling an engagement state of an agent during a human-machine dialog, the computer instructions, when executed on one or more processors, causing the one or more processors to implement operations comprising:
   receiving a spoken request that is a conditional locking request, wherein the conditional locking request uses a natural language expression including (1) a locking command and (2) a locking condition according to which the agent remains in a locked state;
   storing the locking condition in a format that can be evaluated when needed by the agent;
   entering a conditionally locked state in response to the conditional locking request;
   in the conditionally locked state, receiving a multiplicity of requests without a need for a wakeup indicator; and
   for a request from the multiplicity of requests:
      evaluating the locking condition upon receiving the request; and
      processing the request if the locking condition is true.

14. The non-transitory computer-readable recording medium of claim 13, wherein the locking condition is time-based and the natural language expression includes at least one of the words "after," "before," "until," "when," and "while".

15. The non-transitory computer-readable recording medium of claim 13, wherein the locking condition is location-based and the natural language expression includes at least one of the words "in," "outside," "near," "next to," "where," "wherever" and "within".

16. The non-transitory computer-readable recording medium of claim 13, wherein the operations further comprise:
   receiving a spoken request that is an unlock request; and
   exiting the conditionally locked state in response to the unlock request.

17. The non-transitory computer-readable recording medium of claim 13, wherein the operations further comprise:
   receiving a timeout; and
   exiting the conditionally locked state in response to the timeout.

* * * * *